US007110545B2

(12) United States Patent
Furuya et al.

(10) Patent No.: US 7,110,545 B2
(45) Date of Patent: Sep. 19, 2006

(54) METHOD AND APPARATUS FOR SYMMETRIC-KEY ENCRYPTION

(75) Inventors: Soichi Furuya, Fujisawa (JP); Kazuo Takaragi, Ebina (JP); Hiroyuki Kurumatani, Yokohama (JP); Masashi Takahashi, Narashino (JP); Kunihiko Miyazaki, Yohokama (JP); Hisayoshi Sato, Yokohama (JP); Dai Watanabe, Kamakura (JP)

(73) Assignee: Tokyo, Japan, Tokyo (JP)

( * ) Notice: Subject to any disclaimer, the term of this patent is extended or adjusted under 35 U.S.C. 154(b) by 688 days.

(21) Appl. No.: 09/784,254

(22) Filed: Feb. 16, 2001

(65) Prior Publication Data

US 2001/0021253 A1  Sep. 13, 2001

(30) Foreign Application Priority Data

Mar. 9, 2000 (JP) ............................. 2000-070994
Jul. 6, 2000 (JP) ............................. 2000-210690

(51) Int. Cl.
H04L 9/28 (2006.01)

(52) U.S. Cl. .................................................. 380/259
(58) Field of Classification Search ................. 380/37, 380/44, 46, 210, 200, 212, 28, 259; 713/150, 713/189, 192, 169, 193
See application file for complete search history.

(56) References Cited

U.S. PATENT DOCUMENTS

| 6,189,095 B1* | 2/2001 | Coppersmith et al. ....... 713/150 |
| 6,345,101 B1* | 2/2002 | Shukla ........................ 380/210 |
| 6,351,539 B1* | 2/2002 | Djakovic .................... 380/268 |
| 6,708,273 B1* | 3/2004 | Ober et al. .................. 713/189 |
| 2001/0033656 A1* | 10/2001 | Gligor et al. ................. 380/28 |
| 2004/0230799 A1* | 11/2004 | Davis ......................... 713/169 |

FOREIGN PATENT DOCUMENTS

| JP | 07028405 | 1/1995 |
| JP | 11161162 | 6/1999 |

OTHER PUBLICATIONS

Single-Path Authenticated-Encryption Scheme Based on Universal Hashing (pp. 94-109).
An Integrity Check Value Algorithm for Stream Ciphers (pp. 40-48).
Encryption Modes with Almost Free Message Integrity (pp. 529-544).
Cryptography: A New Dimension in Computer Data Security, p. 13-116, Feb. 10, 1986, (p. 64-109).
Integrity Aware Mode of Stream Cipher, The 2000 Symposium on Cryptography and Information Security, SCIS2000-A17, Jan. 10, 2000.
Integrity-Aware PCBC Encryption Schemes, Lecture Notes in Computer Science, vol. 1796, pp. 153-171.
A Zuquete, et al Transparent Authentication and Confidentiality for Stream Sockets, IEEE Micro, vol. 16, No. 3, pp. 34-41, Jun. 1996.

* cited by examiner

Primary Examiner—Jacques H. Louis-Jacques
Assistant Examiner—Ellen C Tran
(74) Attorney, Agent, or Firm—Mattingly, Stanger, Malur & Brundidge, P.C.

(57) ABSTRACT

A symmetric-key cryptographic technique capable of realizing both high-speed cryptographic processing having a high degree of parallelism, and alteration detection. The invention includes dividing plaintext composed of redundancy data and a message to generate plaintext blocks each having a predetermined length, generating a random number sequence based on a secret key, generating a random number block corresponding to one of the plaintext blocks from the random number sequence, outputting a feedback value obtained as a result of operation on the one plaintext blocks and the random number block, the feedback value being fed back for using in the operation on another plaintext blocks, and performing an encryption operation using the one plaintext blocks, random number block, and feedback value.

22 Claims, 34 Drawing Sheets

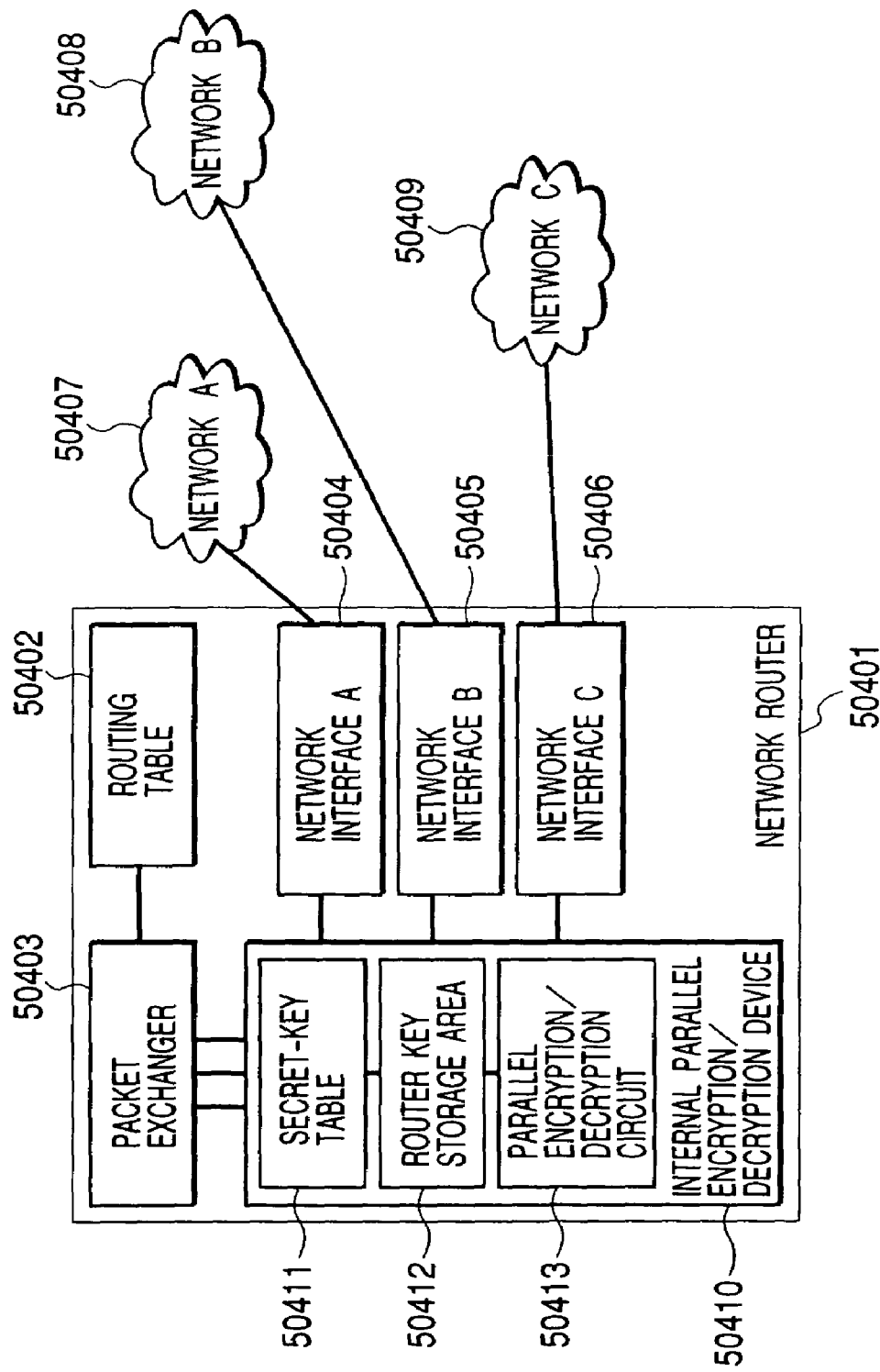

METHOD AND APPARATUS FOR SYMMETRIC-KEY ENCRYPTION

CROSS REFERENCE TO RELATED APPLICATIONS

This application claims priority from Japanese Patent Application Reference No. 2000-070994, filed Mar. 9, 2000, and No. 2000-210690, filed Jul. 6, 2000, the entire contents of which are hereby incorporated by reference.

This application is related to U.S. Ser. No. 09/572,790, filed May 17, 2000 entitled "CRYPTOGRAPHIC APPARATUS AND METHOD", having Soichi Furuya and Michael Roe listed as inventors, the entire contents of which are hereby incorporated by reference.

BACKGROUND OF THE INVENTION

The present invention relates to a technique for ensuring security of confidential information.

Cryptographic processing apparatuses proposed so far employ a block cipher or a stream cipher for concealing data. Various types of block ciphers have been proposed including DES and IDEA. DES and IDEA are described in the following reference.

Reference 1: Menezes, van Oorschot, Vanstone, Handbook of Applied Cryptography, CRC Press, 1996, pp. 250–259, pp. 263–266.

The security of the total cryptographic process of each block cipher and its characteristics are discussed based on a block-cipher operation mode employed, such as ECB, CBC, CFB, OFB, or the counter mode. However, only the iaPCBC mode is known to be capable of performing both cryptographic processing and detection of an alteration at the same time, and other modes cannot detect alterations by themselves. Block-cipher operation modes are described in the following reference.

Reference 2: Schneider, Applied Cryptography, Second Edition, John Wiley & Sons, Inc., 1996, pp. 189–209.

The iaPCBC mode is described in the following reference.

Reference 3: Gligor, Donescu, "Integrity-Aware PCBC Encryption Schemes," Preproceedings in Secure Protocol Workshop, Cambridge, 1999, to appear in Lecture Notes in Computer Science series, Springer-Verlag.

The iaPCBC mode is an operation mode which uses a block cipher. Regarding encryption, the iaPCBC mode can perform neither parallel processing nor preprocessing, which makes it very difficult to implement the iaPCBC mode in the environment in which processing at extremely high speed is required.

On the other hand, there is a system which generates a cryptographic checksum called a "message authentication code" (hereinafter referred to as "MAC") in order to detect alterations. By implementing a MAC generation process as an independent mechanism, and executing the process during cryptographic processing in one of the above block-cipher operation modes, it is possible to perform both cryptographic processing and detection of an alteration at the same time. In this case, however, it is necessary to share two completely independent cryptographic keys, one for encryption and the other for alteration detection, and, furthermore, data to be encrypted must be processed twice, that is, for encryption and for MAC generation. As a result, a realized cryptographic system may be complicated or may not be suitable for processing data having an extended length. In addition, the processing speed of the block cipher is slower than the current communication speed, which means that it is difficult to apply any technique using a combination of the block cipher and MAC to processing of the order of gigabit-per-second or terabit-per-second. MAC is described in the following reference.

Reference 4: Menezes, van Oorschot, Vanstone, Handbook of Applied Cryptography, CRC Press, 1996, pp. 352–368.

In contrast with the block cipher, a stream cipher is an encryption mechanism which uses one of various proposed cryptographic pseudorandom number generators. The stream cipher was not able to detect alterations by itself regardless of security or characteristics of each implementation. Well-known stream ciphers, or pseudorandom number generators used for stream ciphers include SEAL, a linear feedback shift register using a nonlinear combination generator, a linear feedback shift register using a nonlinear filter, and a clock-controlled linear feedback shift register. SEAL is described in the following reference.

Reference 5: Schneider, Applied Cryptography, Second Edition, John Wiley & Sons, Inc., 1996, pp. 398–400.

On the other hand, systems based on the above feedback shift registers are described in the following reference.

Reference 6: Menezes, van Oorschot, Vanstone, Handbook of Applied Cryptography, CRC Press, 1996, pp. 203–212.

A technique using a combination of a stream cipher and a MAC can also perform both cryptographic processing and detection of an alteration at the same time, and, furthermore, processing of a stream cipher is 2 to 20 times faster than that of a block cipher. However, as is the case with the combination of a block cipher and MAC, every MAC generation system (meaning every combination of a stream cipher and MAC) requires sharing of two different keys, and processing of a message twice. When considered in detail, the MAC generation system requires a particular mechanism in addition to that necessary for the stream cipher itself, and considerable computational complexity. For example, MAC generation systems such as HMAC and UMAC require a safe hash function having guaranteed cryptographically-collision-free one-way characteristics. This means that it is necessary to implement the above safe function in addition to a stream cipher. HMAC is described in the above Reference 4 (pp. 355, Example 9.67) while UMAC is described in the following reference.

Reference 7: Black, Halevi, Krawczyk, Krovetz, Rogaway, "UMAC: Fast and Secure Message Authentication," Advances in Cryptology,—CRYPTO '99 Lecture Notes in Computer Science, Vol. 1666, Springer-Verlag, 1999.

Generally, however, hash functions such as SHA-1 and MD5 are very complicated, and are not easy to implement. These hash functions are described in the following reference.

Reference 8: Menezes, van Oorschot, Vanstone, Handbook of Applied Cryptography, CRC Press, 1996, pp. 347–349.

The security of hash functions has not yet been studied adequately in contrast with study of the security of block ciphers. Therefore, a user may not be able to incorporate a hash function because the user cannot rely on the hash function. Of MAC generation systems, MMH uses only a pseudorandom number generator, and requires a very small amount of additional resources such as circuits and programs to add an alteration detection function to the cryptographic process. However, MMH requires a pseudorandom number sequence whose length is as long as that of the message, taking long time to generate necessary random numbers. MMH is described in the following reference.

Reference 9: Halevi, Krawczyk, "MMH: Software Message Authentication in the Gbit/Second Rates," Fast Software Encryption, 4$^{th}$ International Workshop, FSE '97, Lecture Notes in Computer Science, Vol. 1267, Springer-Verlag, 1997.

As described above, the prior art techniques are unsatisfactory in terms of ensuring of security and high-speed processing, and therefore it is required to develop a safer and faster cryptographic processing technique.

SUMMARY OF THE INVENTION

The present invention provides a safer and faster symmetric-key cryptographic processing technique.

The present invention provides a symmetric-key cryptographic method which is capable of performing alteration detection and decryption at the same time, and whose safety for data confidentiality and data alteration protection is provable.

The present invention provides a symmetric-key cryptographic method which advantageously has preprocessing and parallel processing functions, and which is capable of processing at high speed, capitalizing on the high-speed processing characteristics of the pseudorandom number generator.

The present invention provides a symmetric-key cryptographic method whose processing speed is not only faster than that of the conventional block cipher, but can be made still faster as the amount of resources employed is increased, and which can attain a high level of parallel operation for high-speed processing.

The present invention provides a symmetric-key cryptographic method whose processing speed does not drop even when a very short message is processed.

The present invention provides a symmetric-key cryptographic method which can be implemented by adding a very small circuit or program to stream cipher equipment.

The present invention provides a symmetric-key cryptographic method capable of processing each block using a pseudorandom number sequence as a key stream, and detecting an alteration at the same time.

A symmetric-key cryptographic method according to a first aspect of the present invention generates ciphertext C, using plaintext P, a key stream S, redundancy data (hereinafter simply referred to as a redundancy) R, and an initial value V, where the length of the key stream S is longer than that of the ciphertext C.

Specifically, when the length of the redundancy R is b bits and the length of the plaintext P is L=n*b+t bits (t is an integer equal to or larger than 0 and smaller than b, and n is an integer equal to or larger than 0), this method adds ((b−t) mod b) number of "0" bits and then the redundancy R to the end of the plaintext P to produce a character string having a length of L+((b−t) mod b)+b bits. This length is a multiple of the length b.

This character string is divided into blocks Pi($1 \leq i \leq m$) each having b bits. The expression "Xi ($1 \leq i \leq n$)" denotes a string of variables Xi having n elements from 1 to n. In the above case, the key stream must have a length of $2*m*b$ bits.

This key stream is either shared secretly between the encryption side apparatus and the decryption side apparatus beforehand, or generated from a secret key shared beforehand (this secret key corresponds to an input to a pseudorandom number generator, for example).

The key stream of the above length is divided into two block series, $A_i$ and $B_i$ ($1 \leq i \leq m$, each block has b bits).

Letting the feedback initial value $F_0$=V, ciphertext blocks $C_i$ are calculated by the following formula. (This initial value V is also shared but it is not necessary to keep it secret).

$$F_i = P_i \hat{} A_i, \; C_i = (F_i * B_i) \hat{} F_{i-1} (1 \leq i \leq m).$$

The obtained cipher blocks $C_i$ are concatenated to produce a character string, which is output as ciphertext C. Here, the operators "*" and "^" denote multiplication and addition, respectively, in the finite field $F2^b$.

The corresponding decryption is performed as follows.

If the length of ciphertext C' is not a multiple of b bits, a rejection indication is output. If it is a multiple of b bits, on the other hand, the ciphertext C' is divided into blocks $C'_i$ ($1 \leq i \leq m'$) each having b bits.

By setting key stream blocks $A_i$ and $B_i$ ($1 \leq i \leq m'$), and letting the feedback value $F'_0$=V, the following processing is performed.

$$F'_i = (C'_i \hat{} F'_{i-1})/B_i, \; P'_i = A_i \hat{} F'_i (1 \leq i \leq m').$$

The obtained results $P'_i$ are concatenated to produce a character string, which is stored as decryption results P'. The operator "/" denotes division in the finite field $F2^b$.

The redundancy R must be restored as the b-bit character string $P'_m$ if no alteration has been made. It is guaranteed that the probability that an attacker who does not know the keys might successfully make an alteration to the ciphertext without changing the redundancy R, which is restored as the character string $P'_m$, is at most $1/2^b$. Based on the above fact, it is possible to detect alterations by checking whether the character string $P'_m$ is identical to the redundancy R when b is sufficiently large (32 or more).

The symmetric-key cryptographic method of the first aspect is characterized in that influence of an alteration made to a cipher block is propagated to the last block when the ciphertext has been decrypted, whichever cipher block has been altered. Accordingly, even if an attacker makes an alteration without directly changing the redundancy R, it is possible to detect the alteration.

More specifically, after a feedback value for the next block is generated and stored, encryption operation on the current block is performed using a feedback value generated as a result of encryption operation on the previous block. That is, when generated intermediate values are denoted by $X_t$ (t=1 ... n), that is, $X_1, X_2, \ldots X_n$, in the order of generation, and the feedback value $F_i$ for the next block is indicated by the intermediate value $X_i$, and furthermore, the intermediate value to which the feedback value $F_{i-1}$ generated as a result of operation on the previous block is applied is indicated by $X_j$, the arguments i and j have the relationship $i \leq j$ (a necessary condition).

According to the first aspect of the present invention, the probability that an alteration made to ciphertext might pass the alteration detection check is $1/2^b$. However, the method requires division operation in a finite field in decryption, and uses random-number data whose size is twice the size of the plaintext.

Description will be made of a symmetric-key cryptographic method according to a second aspect of the present invention, which does not ensure cryptographic security as high as that provided by the symmetric-key cryptographic method of the first aspect, but can provide more efficient processing, instead.

The symmetric-key cryptographic method of the second aspect processes a message and a redundancy in the same way as they are processed in the symmetric-key cryptographic method of the first aspect. When plaintext with a redundancy has m blocks, a key stream having a length of $b*(m+1)$ bits is required. This key stream is divided into blocks $A_i$ ($1 \leq i \leq m$) and B ($B \neq 0$).

Letting the feedback initial value $F_0=V$, cipher blocks $C_i$ are obtained by the following formula.

$$F_i = P_i \char A_i, \ C_i = (F_i * B) \char F_{i-1} (1 \leq i \leq m)$$

The obtained cipher blocks $C_i$ are concatenated to produce a character string, which is output as ciphertext C.

The corresponding decryption is performed as follows.

If the length of ciphertext C' is not a multiple of b bits, a rejection indication is output. If it is a multiple of b bits, on the other hand, the ciphertext C' is divided into blocks $C'_i$ ($1 \leq i \leq m'$) each having b bits.

As in the encryption, by setting key stream blocks $A_i$ ($1 \leq i \leq m'$) and B, and letting the feedback value $F'_0=V$, the following processing is performed.

$$F'_i = (C'_i \char F'_{i-1})/B, \ P'_i = A_i \char F'_i (1 \leq i \leq m').$$

The redundancy portion is extracted from the obtained series of blocks $P'_i$, and checked whether it is identical to the predetermined redundancy (the encrypted redundancy R). If the redundancy portion is identical to the predetermined redundancy, the remaining blocks of the series of blocks $P'_i$ are output as a message; otherwise a rejection indication is output.

The redundancy (the encrypted redundancy R) must be restored as the b-bit character string $P'_m$ if no alteration has been made.

The symmetric-key cryptographic method of the second aspect uses a plurality of key streams (each obtained from a different pseudorandom number sequence) during encryption/decryption of blocks (plaintext or ciphertext blocks). Of the plurality of key streams, one is changed for each iteration of the processing while the others are left unchanged, that is, the same key streams are used for all the iterations. More specifically, when two pseudorandom number sequences (key streams) supplied for encryption/decryption of the i-th block are denoted as $A_i$ and $B_i$, the key stream $A_i$ is changed each time a block is processed, whereas $B_i$ is not changed during processing of all the blocks.

According to the second aspect of the present invention, the probability that an alteration made to ciphertext by an attacker who does not know the keys might not be detected in the subsequent alteration detection process is $(m-1)/2^b$. Generally, the alteration success rate is preferably $1/2^{32}$ or less. Since the data length m is set to about $2^{32}$ at maximum for actual implementation, b is preferably equal to 64 or more. In such a case, multiplication operation in the finite field $F2^{64}$ is performed for both encryption and decryption. This operation is implemented by means of hardware at very high speed and low cost. In the case of software implementation, however, high-speed operation may be provided using a symmetric-key cryptographic method according to a third aspect of the present invention as described below.

The symmetric-key cryptographic method according to the third aspect of the present invention uses a longer redundancy. To begin with, the redundancy is set to have $b*d$ bits, assuming that the subsequent processing is carried out in units of b bits. The message and the redundancy are processed in the same way as they are processed in the symmetric-key cryptographic methods of the first and second aspects to produce a series of blocks $P_i$ ($1 \leq i \leq m, m \leq d$) composed of the message and the redundancy, each block having b bits. The key stream is set to have a length of $b*(m+d)$ bits, and is divided into two block series $A_i$ ($1 \leq i \leq m$) and $B_i$ ($\neq 0$, $1 \leq i \leq d$)

Letting the feedback initial value $F^{(i)}_0 = V_i$ ($1 \leq i \leq d$), cipher blocks $C_i$ are calculated by the following formula.

$$F^{(1)}_i = P_i \char A_i,$$

$$F^{(j+1)}_i = (F^{(j)}_i * B_j) \char F^{(j)}_{i-1} (1 \leq j \leq d),$$

$$C_i = F^{(d+1)}_i (1 \leq i \leq m).$$

The obtained cipher blocks $C_i$ are concatenated to produce a character string, which is output as ciphertext C.

The corresponding decryption is performed as follows.

If the length of ciphertext C' is not a multiple of b bits, a rejection indication is output. If it is a multiple of b bits, on the other hand, the ciphertext C' is divided into blocks $C'_i$ ($1 \leq i \leq m'$) each having b bits.

As in the encryption, by setting key stream blocks $A_i$ ($1 \leq i \leq m'$) and $B_i$ ($\neq 0$, $1 \leq i \leq d$), and letting the feedback initial value $F^{(i)}_0 = V_i$ ($1 \leq i \leq d$), the following processing is performed.

$$F'^{(d+1)}_i = C'_i,$$

$$F'^{(j)}_i = (F'^{(j+1)}_i \char F'^{(j)}_{i-1})/B_j (1 \leq j \leq d),$$

$$P'_i = A_i \char F'^{(1)}_i (1 \leq i \leq m).$$

The redundancy portion is extracted from the obtained blocks $P'_i$, and checked whether it is identical to the predetermined redundancy (the encrypted redundancy). If the extracted redundancy is identical to the predetermined redundancy, the remaining blocks of the blocks $P'_i$ are output as a message; otherwise a rejection indication is output.

In the symmetric-key cryptographic method of the third aspect, although a redundancy having a length of $b*d$ bits is used, operations necessary for encryption and decryption are carried out in the finite field $F2^b$. Multiplication in the finite field $F2^b$ requires a computational amount (computational complexity) only $1/d^2$ of that required by multiplication in the finite field $F2^{b*d}$. However, since the number of required multiplication operations increases by a factor of d, this high-speed processing method possibly takes time about $1/d$ of the time taken by the conventional method to complete the multiplication operations using a redundancy of the same length.

A symmetric-key cryptographic method according to a fourth aspect of the present invention incorporates the multiplication in the finite field $F2^b$ employed by the symmetric-key cryptographic methods of the first through third aspects into the 3-round Feistel structure. Specifically, the operation $A*B$ is replaced by a function which calculates $$M_1 = A_L \char (A_R * B_L), \ M_2 = A_R \char (M_1 * B_R), \ M_3 = M_1 \char (M_2 B_L),$$

and outputs $M_3 \| M_2$ ($B_L$ and $B_R$ can be switched around, as $A_L$ and $A_R$, or $M_2$ and $M_3$). These operations are self-invertible, and therefore the same operations can be used for the corresponding decryption.

A fifth aspect of the present invention relates to a method of dividing a message for processing. Specifically, plaintext P is divided into a predetermined number t of character strings $P_i$ ($1 \leq i \leq t$). The predetermined number t is decided according to a rule on which both the transmitter and the receiver have agreed. Each character string is combined with a different redundancy $R_i$ ($1 \leq i \leq t$) and then encrypted to produce ciphertext $C_i$ using a symmetric-key cryptographic method according to one of the above aspects of the present invention. Separately from the above process, all redundancies $R_i$ are concatenated to produce plaintext $(R_1\|R_2\|R_3\| \ldots \|R_t)$, which is then encrypted using a redundancy R shared between the transmitter and the receiver to obtain ciphertext $C_{t+1}$. The above pieces of ciphertext (a series of ciphertext blocks) are concatenated (that is, $C_1\|C_2\|C_3\| \ldots \|C_{t+1}$) to produce the final ciphertext C.

In the corresponding decryption, the ciphertext is divided into t number of character strings according to a predetermined rule, and the character strings are each decrypted separately. If each decryption result is not a reject, and all the redundancies Ri are included in the redundancy plaintext (encrypted using the redundancy R in the encryption process, and now obtained as a result of decryption), the decryption results are accepted, and each piece of plaintext obtained as a result of decryption is concatenated in the order of the corresponding redundancy. If any one of the decryption results is a reject, the entire decryption results are rejected.

According to a sixth aspect of the present invention, multiplication in the finite field $F2^b$ in the above five aspects of the present invention is replaced with multiplication in the finite field Fp, where p is a prime number which can be expressed as "$2^k+1$" using an integer k.

Specifically, the operation $a*(b+1)+1$ in the finite field Fp is performed instead of the multiplication $a*b$ in the finite field $F2^b$. This operation can be accomplished by a combination of one multiplication operation, two addition operations, and one shift operation of a $2^b$-bit shift register, making it possible to perform multiplication operations in the finite field $F2^b$ using a general-purpose processor at high speed.

The above operation $a*(b+1)+1$ in the finite field Fp can provide high-speed processing, compared with multiplication in $F2^b$, which requires b number of exclusive OR operations and b number of shift operations, and compared with multiplication in Fp using a general prime number p, which requires one multiplication operation and one division operation (a division operation requires time a few tens of times longer than that required by an addition operation or a shift operation).

Since the present invention uses pseudorandom numbers, a user can employ a cryptographic primitive which the user believes is most reliable by selecting one from among block ciphers, hash functions, and stream ciphers as the pseudorandom number generator, which means that the security of the system can be easily attributed to the cryptographic primitive which the user has selected. Furthermore, the pseudorandom number generation can be carried out separately from the plaintext and the ciphertext processing, making it possible to employ parallel processing and pre-processing, resulting in processing at high speed.

As for implementation cost, the present invention can avoid additional implementation which is difficult to make, such as the additional implementation of a hash function.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 39 is a diagram showing the configuration of an encryption/decryption router according to a tenth embodiment of the present invention.

DETAILED DESCRIPTION OF THE PREFERRED EMBODIMENTS

First Embodiment

Figure 1:
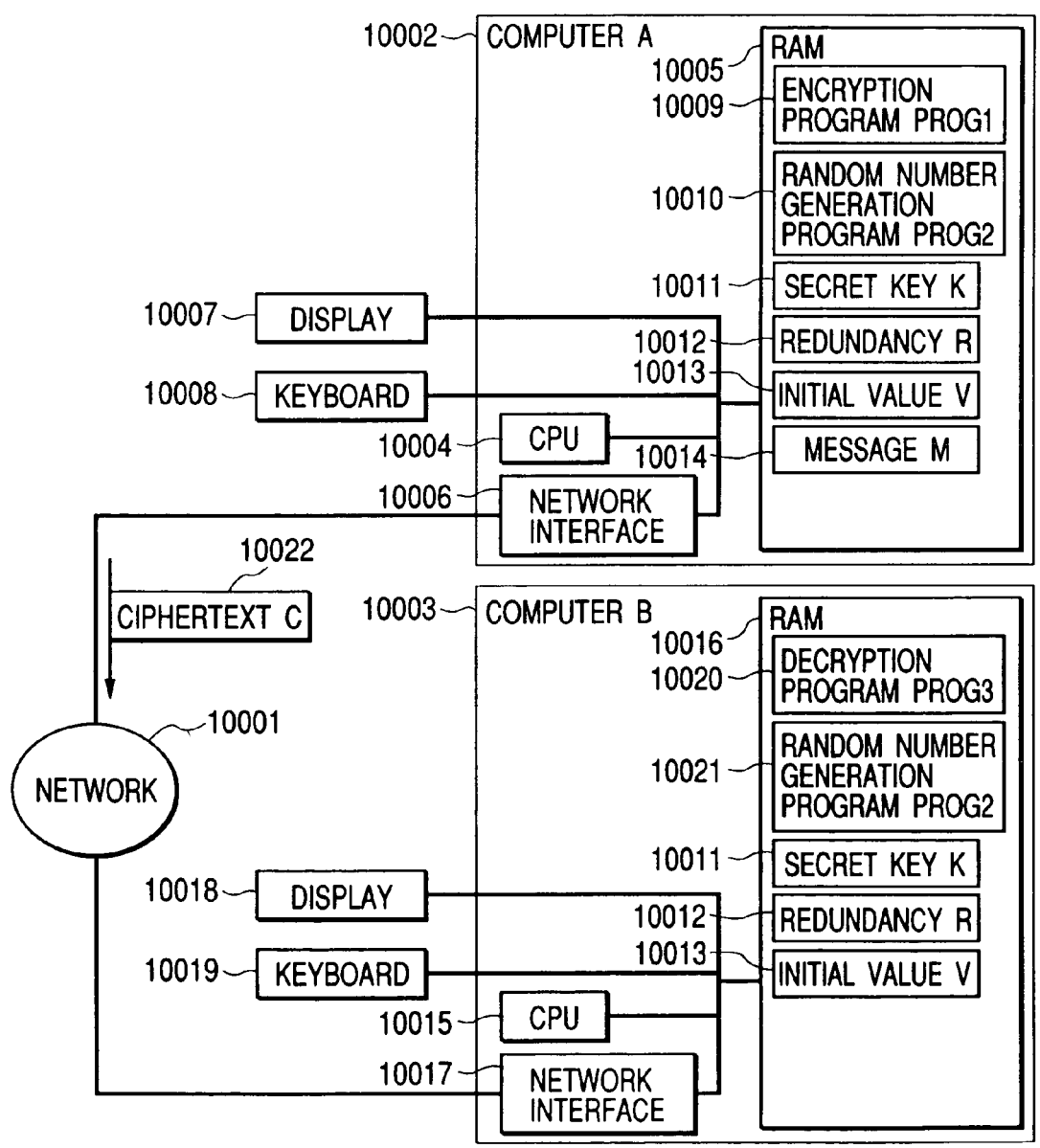
FIG. 1 is a system configuration employed in embodiments of the present invention.

FIG. 1 shows the configuration of a computer system including a computer A10002 and a computer B10003 connected to each other through a network 10001 for cryptocommunications from the computer A10002 to the computer 10003. The computer A10002 has an operation unit (hereinafter referred to as "CPU") 10004, a memory unit (volatile or nonvolatile, hereinafter referred to as "RAM") 10005, and a network interface 10006 therein, and a display 10007 and a keyboard 10008 externally connected thereto for the user to operate the computer A10002. The RAM 10005 stores an encryption program PROG1_10009, a random number generation program PROG2_10010, a secret key K10011, which is secret information shared only between the computers A10002 and B10003, a redundancy R10012 and an initial value V10013, which both are data shared between the computers A10002 and B10003, and encryption-target data 10014 to be transmitted to the computer B1003. The computer B10003 has a CPU 10015, a RAM 10016, and a network interface 10017 therein, and a display 10018 and a keyboard 10019 externally connected thereto for the user to operate the computer B10003. The RAM 10016 stores a decryption program PROG3_10020, a random number generation program PROG2_10021, the secret key K10011, the redundancy R10012, and the initial value V10013.

The computer A10002 executes the encryption program PROG1_10009 to generate ciphertext C10022 from a message M10014, and transmits the generated ciphertext C10022 to the network 10001 through the network interface 10006. Receiving the ciphertext C10022 through the network interface 10017, the computer B10003 executes the decryption program PROG3_10020, and if no alteration is detected, the computer B10003 stores the decryption results in the RAM 10016.

Each program employed can be introduced into each RAM by receiving the program from another computer in the form of a transmission signal, which is a transmission medium on the network 10001, or by using a portable medium such as a CD or an FD. Each program can be configured so that it runs under control of the operating system (not shown) of each computer.

The encryption program PROG1_10009 is read out from the RAM 10005, and executed by the CPU 10004 in the computer A10002. The encryption program PROG1_10009 internally calls a random number generation program PROG2_10010 as a subroutine to process the input secret key K10011, the redundancy R10012, the initial value V10013, and the message M10014 so as to output ciphertext C10022.

The decryption program PROG3_10020 is read out from the RAM 10016, and executed by the CPU 10015 in the computer B10003. The decryption program PROG3_10020 internally calls a random number generation program PROG2_10021 as a subroutine to process the input key 10011, the redundancy R10012, the initial value V10013, and the ciphertext C10022 so as to output a message or an alteration detection alarm.

Description will be made of the process flow of the encryption program PROG1_10009.

Step 20002 (a data setting subroutine): waits for input of an initial value V, a redundancy R, and a secret key K.

Step 20003 (a plaintext preparation subroutine): waits for input of plaintext, adds predetermined padding and a redundancy to the given plaintext, and divides the padded plaintext into a series of plaintext blocks $P_i$ ($1 \leq i \leq n$) each having 64 bits and outputs them.

Step 20004 (a random number generation subroutine): outputs pseudorandom number sequences $A_i$ and $B_i$ ($1 \leq i \leq n$) based on the secret key K.

Step 20005 (an encryption subroutine): uses the pseudorandom number sequences $A_i$ and $B_i$, the series of plaintext blocks $P_i$ ($1 \leq i \leq n$), and the initial value V to output a series of ciphertext blocks $C_i$ ($1 \leq i \leq n$).

Step 20006: concatenates the series of ciphertext blocks $C_i$ ($1 \leq i \leq n$) obtained at step 20005 one after another sequentially to output ciphertext C.

In this specification, the term "padding" used above refers to addition of additional data to main data. In the case of padding of digital data, the additional data is often concatenated to the main data, simply bits to bits.

Figure 2:
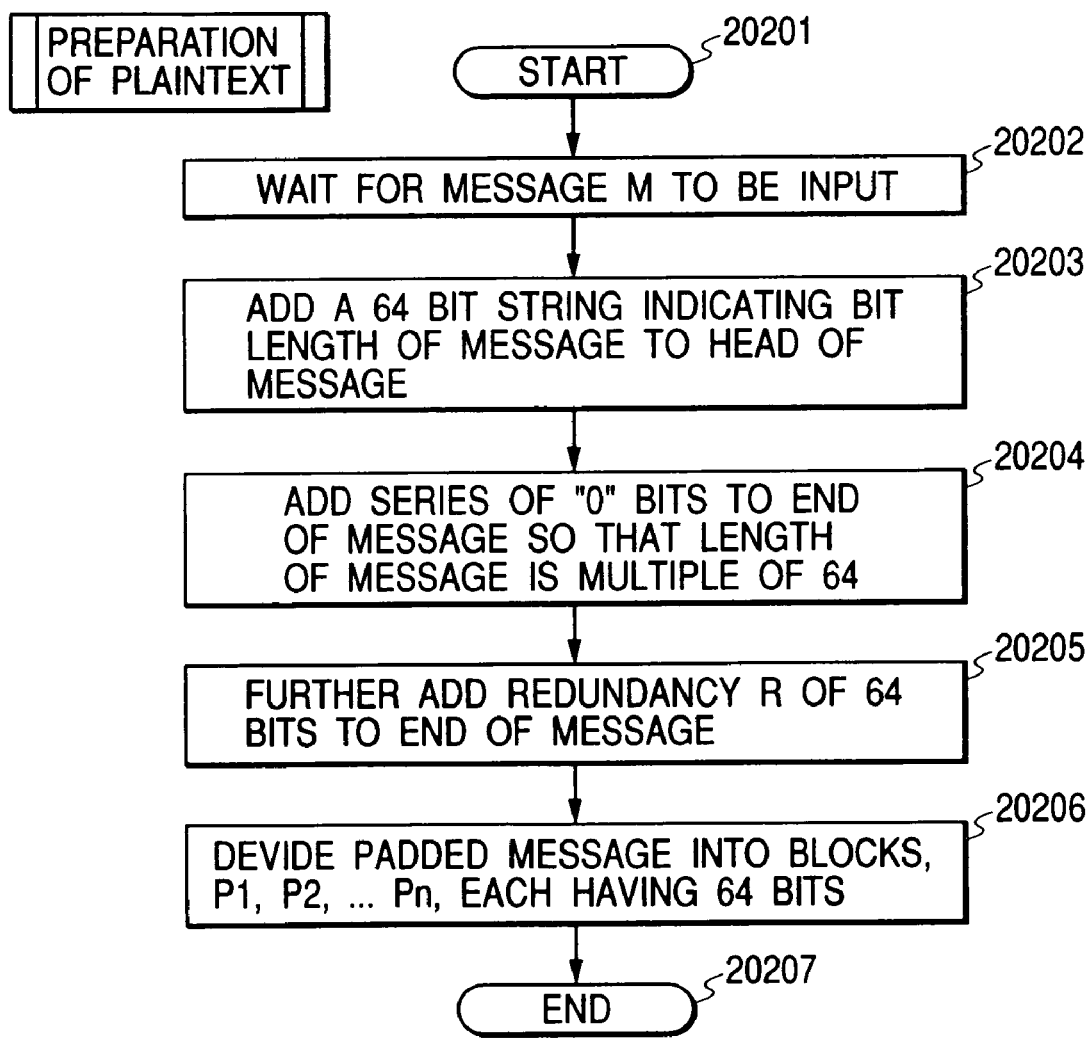
FIG. 2 is a flowchart of a plaintext preparation subroutine.

Description will be made of the process flow of the plaintext preparation subroutine with reference to FIG. 2.

Step 20202: waits for input of an encryption-target message M. The message M is either input from the keyboard 10008 or read out from a RAM, or introduced from another medium.

Step 20203: adds padding indicating the length of the message. Specifically, this step adds 64-bit binary data indicating the length of the message M to the head of the message M.

Step 20204: adds padding to the message so that the length of the message is a multiple of a predetermined number. Specifically, the padded data is set to have an integer multiple of 64 bits for subsequent processing. When the length of the message M to which the data indicating the length is added at step 20203 is L bits, this step adds (64−L(mod 64)) number of 0s to the end of the message M.

Step 20205 (addition of redundancy data): further adds a redundancy R of 64 bits to the end of the message.

Step 20206 (division of message data into plaintext blocks): divides the data obtained at step 20205 into blocks $P_1, P_2, \ldots P_n$, each having 64 bits.

Figure 3:
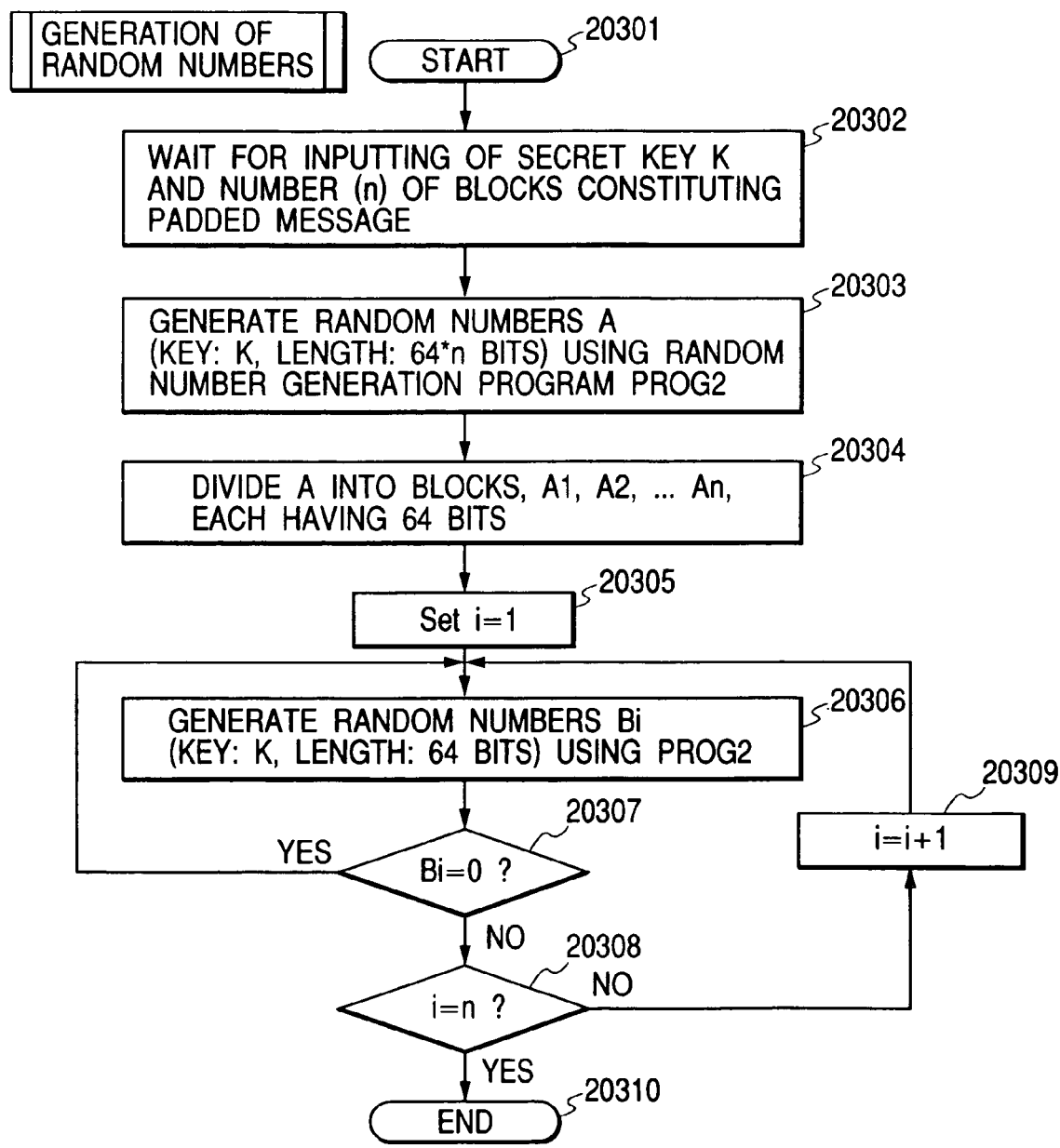
FIG. 3 is a flowchart of a random number generation subroutine.

Description will be made of the process flow of the random number generation subroutine with reference to FIG. 3.

Step 20302 (input of necessary parameters): obtains the number n of blocks making up the padded message, and the secret key K.

Step 20303 (generation of a pseudorandom number sequence A): calls the random number generation program PROG2 to generate a pseudorandom number sequence having 64*n bits and output it as a pseudorandom number sequence A.

Step 20304 (division of random number sequence A into blocks): divides the pseudorandom number sequence A into blocks $A_1, A_2, \ldots, A_n$, each having 64 bits.

Step 20305 (initialization of a counter i): initializes a counter so that i=1.

Step 20306 (generation of a random number $B_i$): executes PROG2 using the secret key K to generate a random number $B_i$ having 64 bits.

Step 20307: if the random number $B_i$ generated at step 20306 is 0, returns to step 20306.

Step 20308: if i=n, performs step 20310.

Step 20309: increments the counter i and returns to step 20306.

Figure 4:
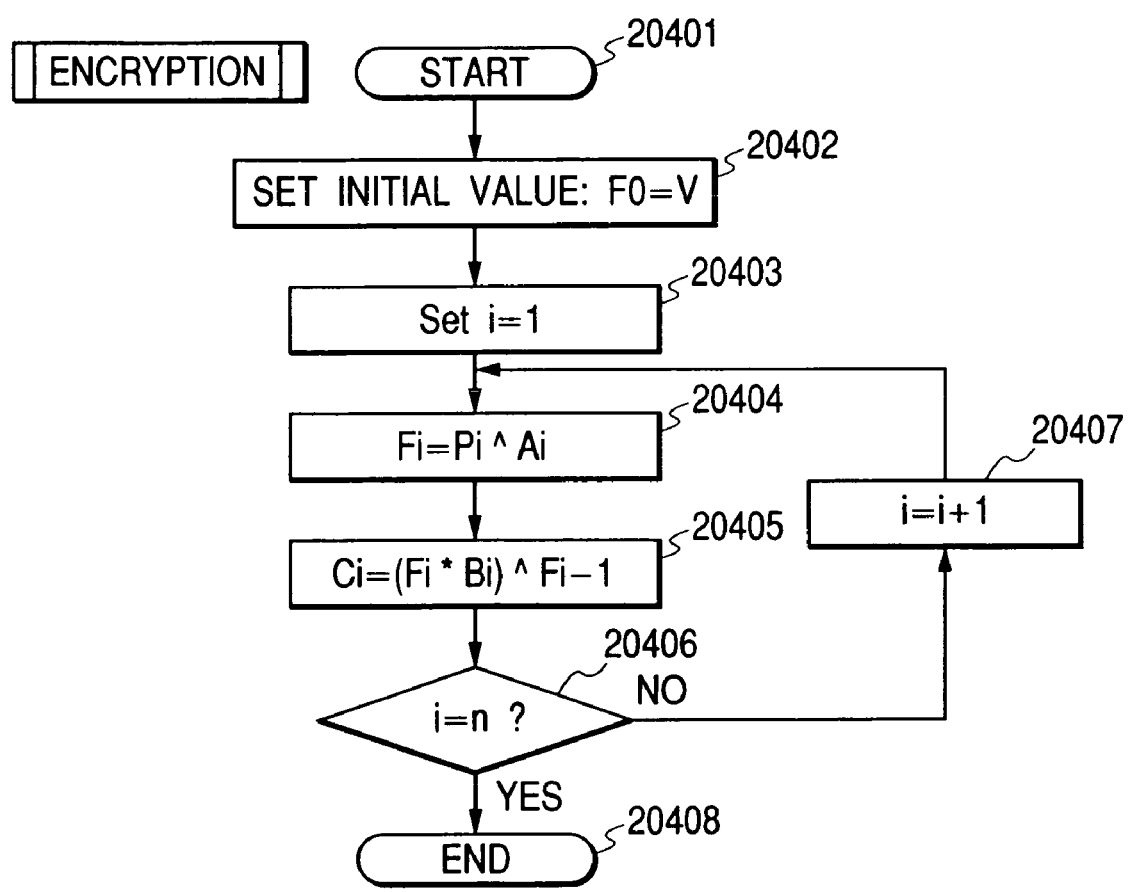
FIG. 4 is a flowchart of an encryption subroutine.

Description will be made of the process flow of the encryption subroutine with reference to FIG. 4.

Step 20402: sets an initial value $F_0$ so that $F_0=V$.

Step 20403: sets a counter so that i=1.

Step 20404: calculates a feedback value $F_i$ by the formula $F_i = P_i \wedge A_i$.

Step 20405: calculates a ciphertext block $C_i$ by the formula $C_i = (F_i * B_i) \wedge F_{i-1}$.

Step 20406: if i=n, performs step 20408.

Step 20407: increments the counter i and returns to step 20404.

Figure 5:
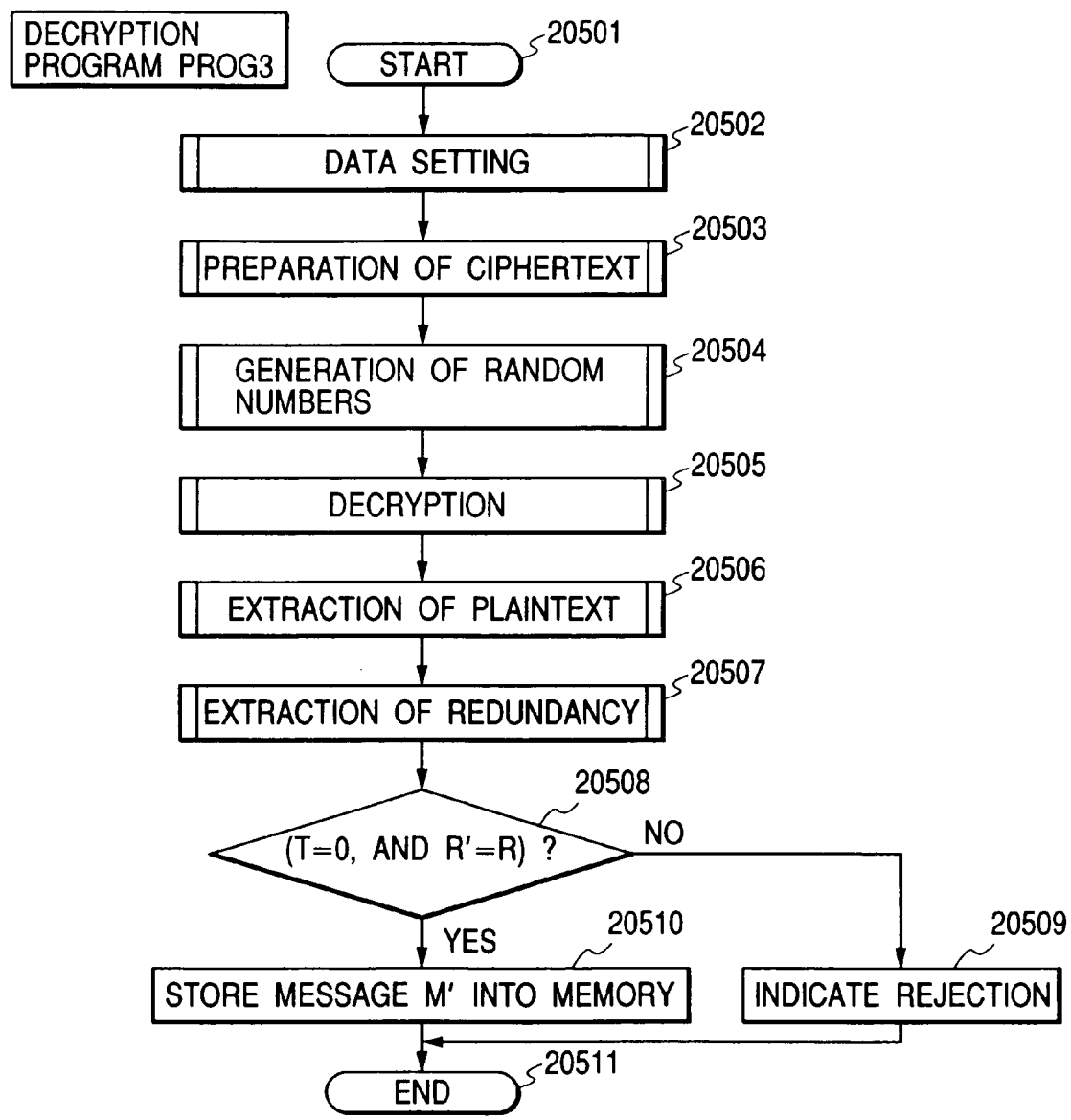
FIG. 5 is a flowchart of the decryption program shown in FIG. 1.

Description will be made of the process flow of the decryption program PROG3_10020 with reference to FIG. 5.

Step 20502 (a data setting subroutine): waits for input of the initial value V, the redundancy R, and the secret key K.

Step 20503 (a ciphertext preparation subroutine): waits for input of ciphertext C', and divides the given ciphertext C' into a series of ciphertext blocks $C'_i$ ($1 \leq i \leq n$) each having 64 bits and outputs them.

Step 20504 (a random number generation subroutine): outputs pseudorandom number sequences $A_i$ and $B_i$ ($1 \leq i \leq n$) based on the secret key K.

Step 20505 (a decryption subroutine): uses the pseudorandom number sequences $A_i$ and $B_i$, the series of ciphertext blocks $C'_i$ ($1 \leq i \leq n$), and the initial value V to output a series of plaintext blocks $P'_i$ ($1 \leq i \leq n$).

Step 20506 (a plaintext extraction subroutine): combines the series of plaintext blocks $P'_i$ into three data strings L', M', and Z'.

Step 20507 (a redundancy extraction subroutine): divides Z' into R' and T'.

Step 20508: if T=0 and R'=R, proceeds to step 20510.

Step 20509: outputs a rejection indication and proceeds to step 25011.

Step 20510: stores M' into a RAM.

At step 20509 or 20510, the decryption program outputs a result (acceptance/rejection or the encryption result) to the display 10018 as a notification to the user.

Figure 6:
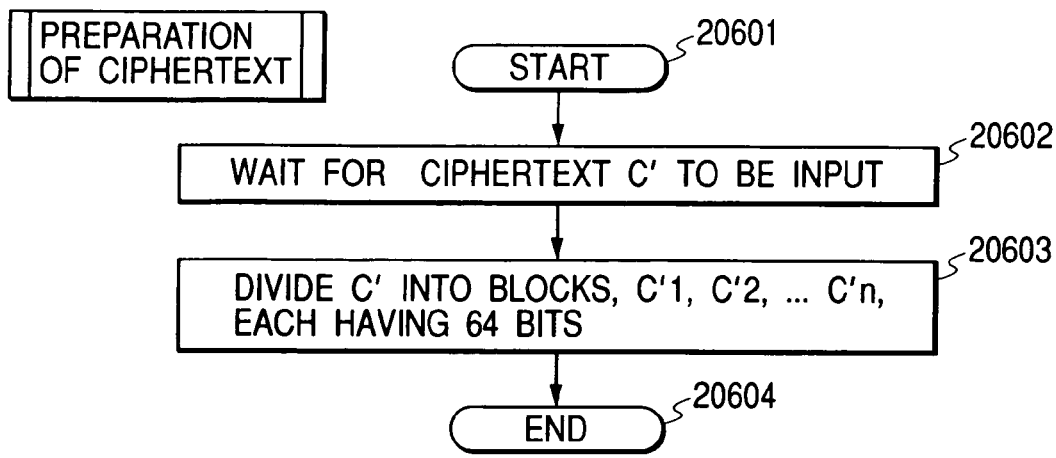
FIG. 6 is a flowchart of the ciphertext preparation subroutine shown in FIG. 5.

Description will be made of the process flow of the ciphertext preparation subroutine with reference to FIG. 6.

Step 20602: waits for input of ciphertext C'.

Step 20603: divides the ciphertext C' into blocks $C'_1, C'_2, \ldots C'_n$, each having 64 bits.

Figure 7:
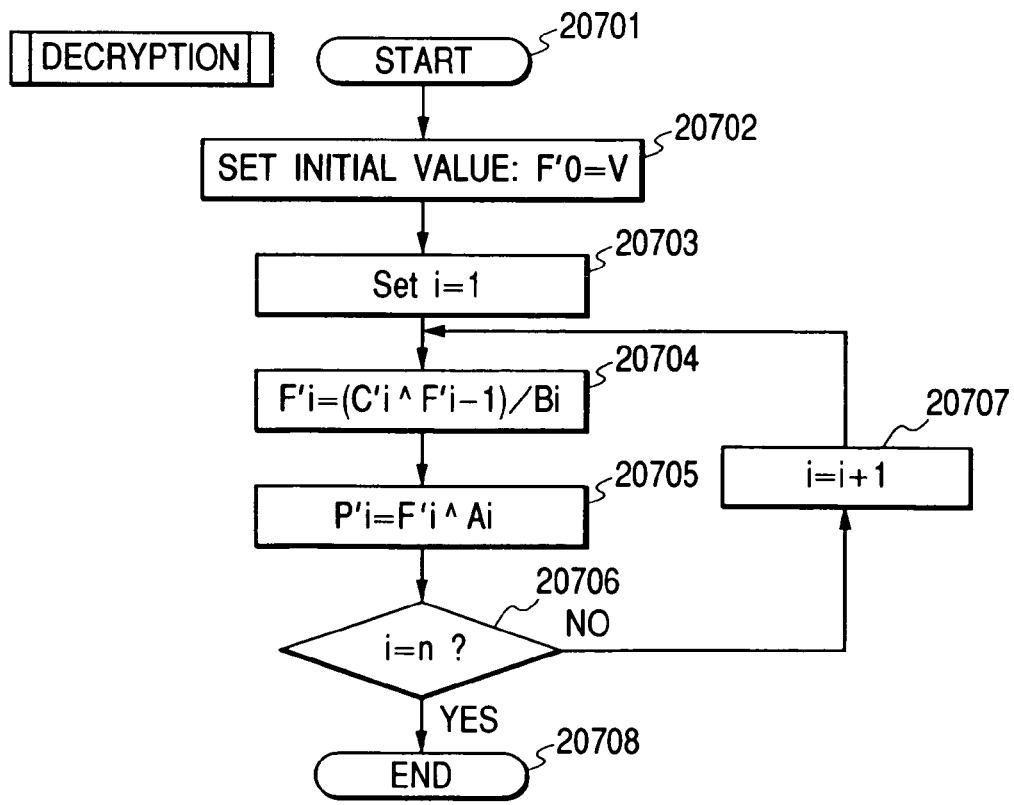
FIG. 7 is a flowchart of the decryption subroutine shown in FIG. 5.

Description will be made of the process flow of the decryption subroutine with reference to FIG. 7.

Step 20702: sets an initial value $F'_0$ so that $F'_0=V$.

Step 20703: initializes a counter so that i=1.

Step 20704: calculates a feedback value $F'_i$ by the formula $F'_i = (C'_i \wedge F'_{i-1})/B_i$.

Step 20705: calculates a plaintext block $P'_i$ by the formula $P'_i = F'_i \wedge A_i$.

Step 20706: if i=n, performs step 20708.

Step 20707: increments the counter i and returns to step 20704.

Figure 8:
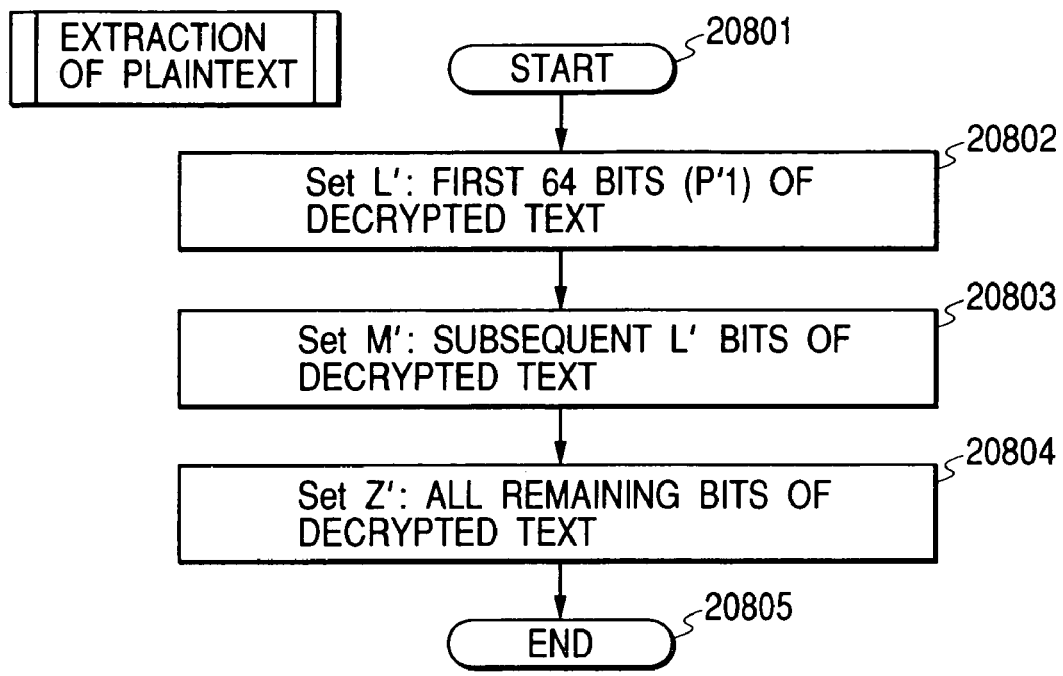
FIG. 8 is a flowchart of the plaintext extraction subroutine shown in FIG. 5.

Description will be made of the process flow of the plaintext extraction subroutine with reference to FIG. 8.

Step 20802: sets L' to the first 64-bit plaintext block.

Step 20803: sets M' to the L' number of bits starting from the most significant bit of $P'_2$ included in the series of decrypted plaintext blocks.

Step 20804: after L' and M' are removed from the series of decrypted plaintext blocks, sets Z' to the remaining decrypted plaintext blocks (data).

Figure 9:
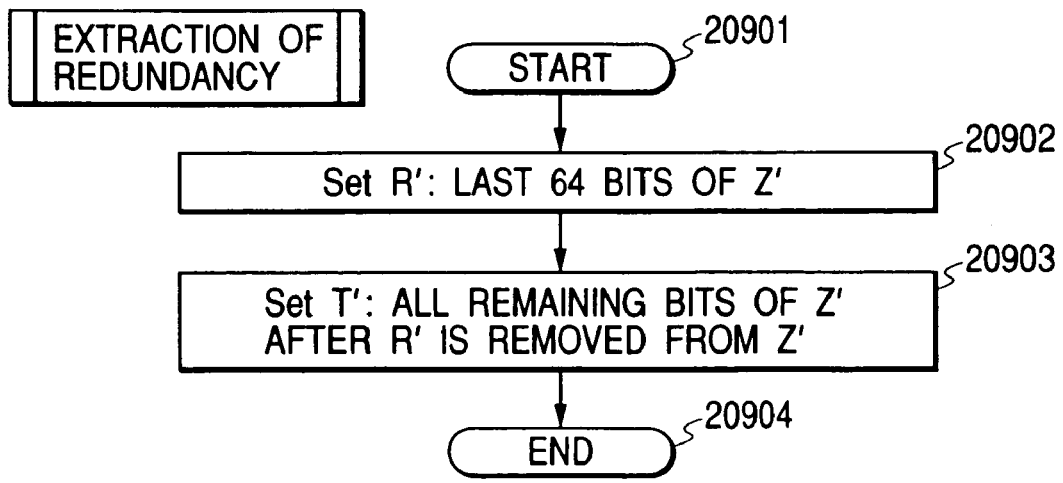
FIG. 9 is a flowchart of the redundancy extraction subroutine shown in FIG. 5.

Description will be made of the process flow of the redundancy extraction subroutine with reference to FIG. 9.

Step 20902: sets R' to the lower 64 bits of Z'.

Step 20903: after R' is removed from Z', sets T' to the remaining data.

Figure 10:
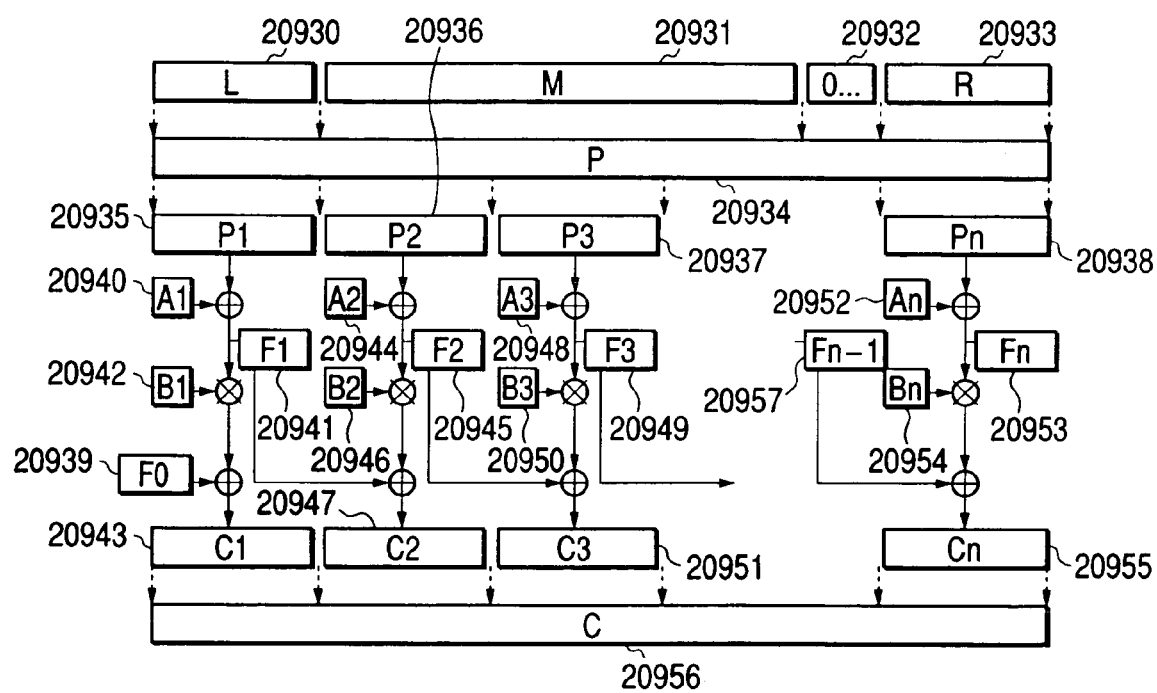
FIG. 10 is a diagram showing data blocks in encryption.

FIG. 10 is an explanatory diagram showing the encryption process. The encircled plus "(+)" denotes an exclusive OR logic operation between two pieces of data each having a width of 64 bits, while the encircled X mark "(X)" denotes a multiplication operation between two pieces of data each having a width of 64 bits in the finite field $F2^{64}$.

The message M20931 is added with data 20930 indicating the length, appropriate padding 20932, and a redundancy R20933 to produce plaintext P20934.

The produced plaintext P20934 is divided into blocks $P_1$_20935, $P_2$_20936, $P_3$_20937, ... $P_n$_20938, each having 64 bits.

$P_1$_20935 and $A_1$_20940 are exclusive-ORed to produce a feedback value $F_1$_20941 which is then multiplied by $B_1$_20942 in a finite field. The result is exclusive-ORed with an initial value $F_0$_20939 to obtain a ciphertext block $C_1$_20943.

Similarly, $P_2$_20936 and $A_2$_20946 are exclusive-ORed to produce a feedback value $F_2$_20945 which is then multiplied by $B_2$_20946 in a finite field. The result is exclusive-ORed with the feedback value $F_1$_20941 to obtain a ciphertext block $C_2$_20947.

The above procedure is repeated up to $P_n$_20938, obtaining ciphertext blocks $C_1$_20943, $C_2$_20947, $C_3$_20951, ..., $C_n$_20955. The ciphertext blocks are concatenated one after another in that order to obtain ciphertext C_20956.

Figure 11:
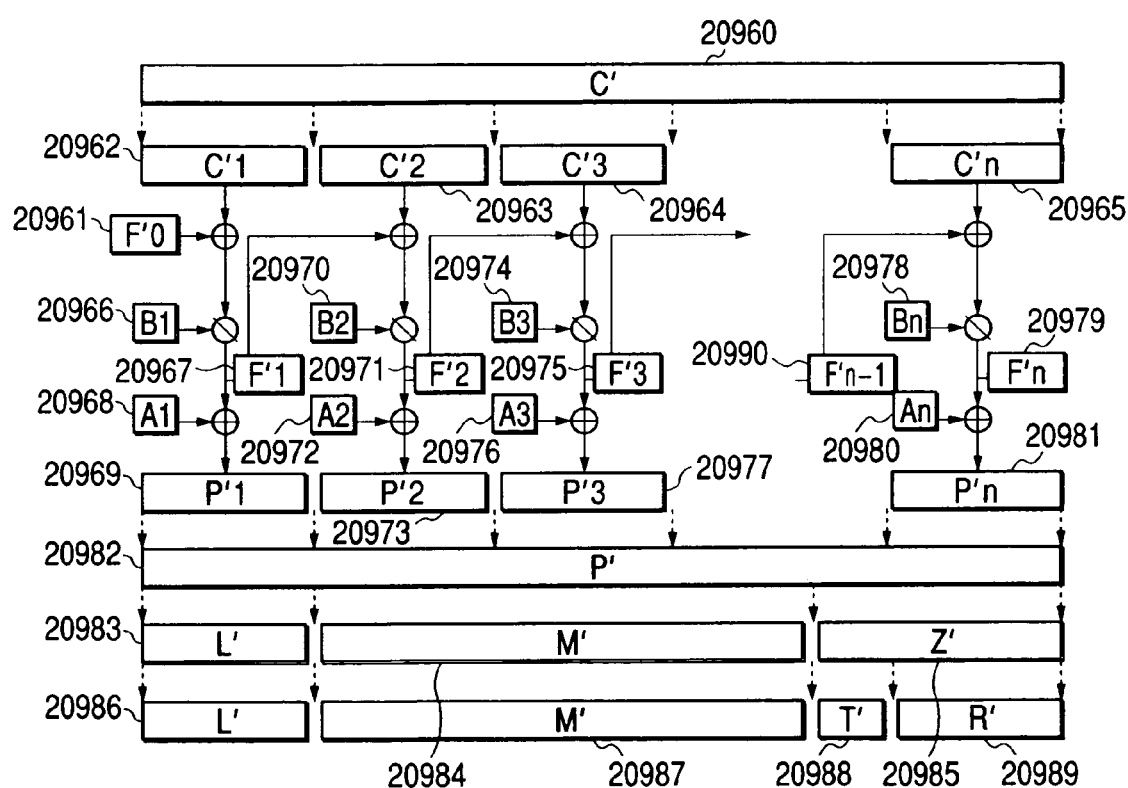
FIG. 11 is a diagram showing data blocks in the decryption shown in FIG. 7.

FIG. 11 is an explanatory diagram showing the decryption process. The encircled slash "(/)" denotes a division operation between two pieces of data each having a width of 64 bits in the finite field $F2^{64}$. In the figure, data introduced to the encircled slash symbol from top is the dividend, while data introduced from left is the divisor.

Ciphertext C'_20960 is divided into blocks $C'_1$_20962, $C'_2$_20963, $C'_3$_20964, ..., $C'_n$_20965, each having 64 bits.

$C'_1$ and an initial value $F'_0$_20961 are exclusive-ORed, and the result is divided by $B_1$_20966. The division result is set as a feedback value $F'_1$_20967. The feedback value $F'_1$_20967 and $A_1$_20968 are exclusive-ORed to obtain a plaintext block $P'_1$_20969.

The other blocks $C'_2$_20963, $C'_3$_20964, ..., $C'_n$_20965 are also processed in the same way as $C'_1$_20962 to obtain plaintext blocks $P'_1$_20969, $P'_2$_20972, $P'_3$_20977, ..., $P'_n$_20981, which are then concatenated one after another to produce plaintext P'_20982. The plaintext P'_20982 is divided into L'_20983, M'_20984, and Z'_20985. Furthermore, Z'_20985 is divided into T'_20988 and R'_20989 so as to check the redundancy R'_20989.

The first embodiment uses a pseudorandom number sequence whose length is about twice as long as that of the message for cryptographic processes. Even though pseudorandom-number processing is faster than block-cipher processing, it is highest in computational complexity in these cryptographic processes. Therefore, it is desirable to reduce the number of random numbers to use.

Second Embodiment

As describe below, a second embodiment of the present invention employs a function different from that used by the first embodiment. By employing this function, the second embodiment can reduce the number of random numbers necessary to use, and use the same divisor for each iteration in its decryption process, which makes it possible to perform the division operation at substantially the same speed as that of a multiplication operation if the reciprocal is calculated beforehand, resulting in very efficient processing.

The second embodiment employs an encryption program PROG1A and a decryption program PROG3A instead of the encryption program PROG1 and the decryption PROG3, respectively.

The encryption program PROG1A replaces the random number generation subroutine 20004 and the encryption subroutine 20005 employed in the encryption program PROG1_10009 in FIG. 1 by a random number generation 2 subroutine 21004 and an encryption 2 subroutine 21005, respectively.

Figure 12:
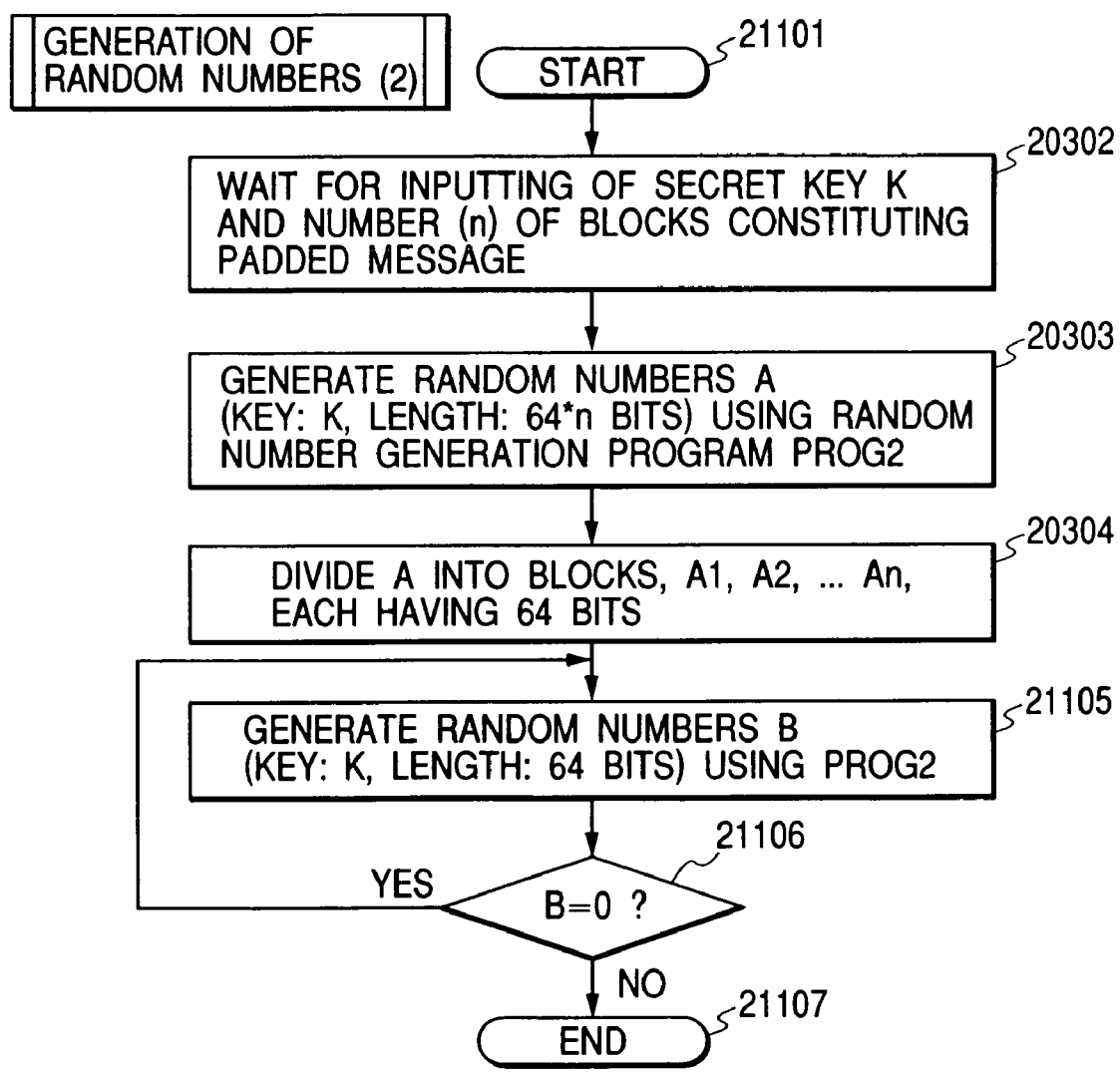
FIG. 12 is a flowchart of the random number generation 2 subroutine according to a second embodiment of the present invention.

Description will be made of the process flow of the random number generation 2 subroutine 21004 with reference to FIG. 12.

Step 21102 (input of necessary parameters): obtains the number n of message blocks making up a padded message, and a secret key K.

Step 21103 (generation of pseudorandom number sequence A): calls the random number generation program PROG2 to generate a pseudorandom number sequence having 64*n bits and output it as a pseudorandom number sequence A.

Step 21104 (division of pseudorandom number sequence A into blocks): divides the pseudorandom number sequence A into blocks $A_1, A_2, \ldots, A_n$, each having 64 bits.

Step 21105 (generation of random number B): executes PROG2 using the secret key K to generate a random number B having 64 bits.

Step 21106: if the value of B generated at step 21105 is 0, returns to step 21105.

Figure 13:
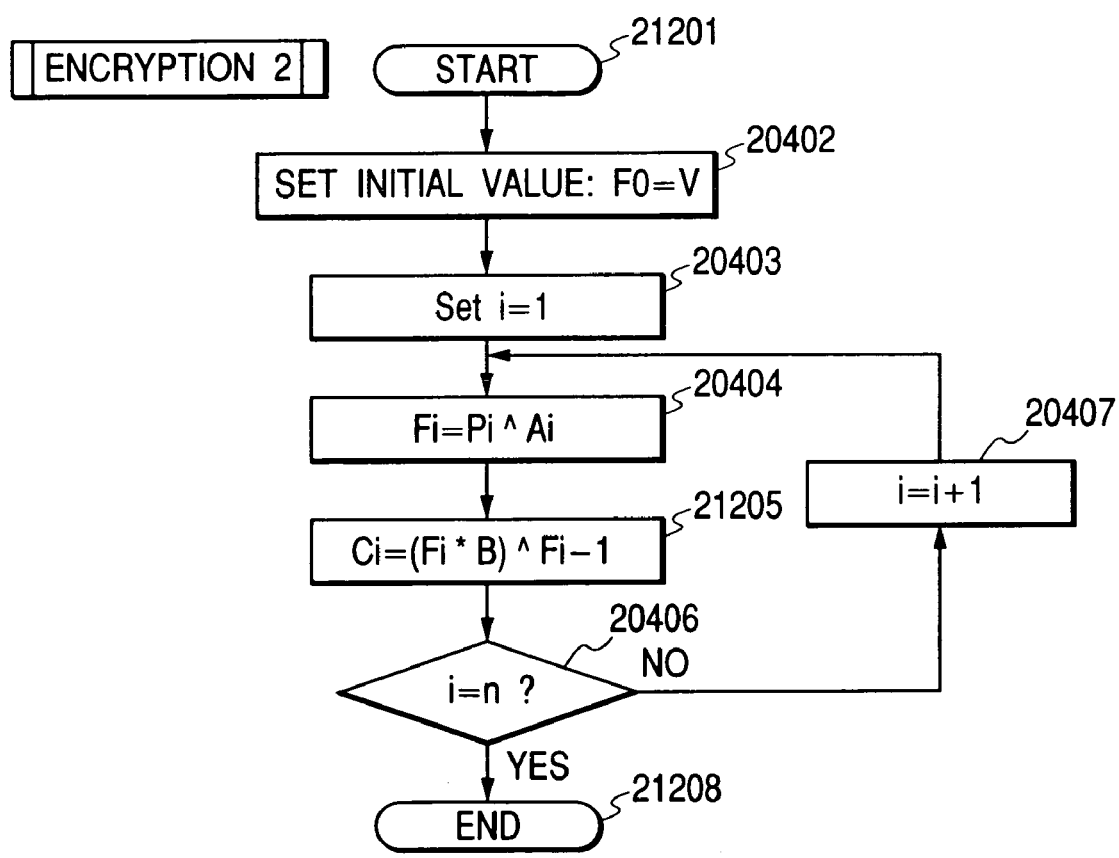
FIG. 13 is a flowchart of the encryption 2 subroutine of the second embodiment.

Description will be made of the process flow of the encryption 2 subroutine 21005 with reference to FIG. 13.

Step 21202: sets an initial value $F_0$ so that $F_0=V$.

Step 21203: sets a counter so that i=1.

Step 21204: calculates a feedback value $F_i$ by the formula $F_i = P_i \wedge A_i$.

Step 21205: calculates a ciphertext block $C_i$ by the formula $C_i = (F_i * B) \wedge F_{i-1}$.

Step 21206: if i=n, performs step 21208.

Step 21207: increments the counter i and returns to step 21204.

Figure 14:
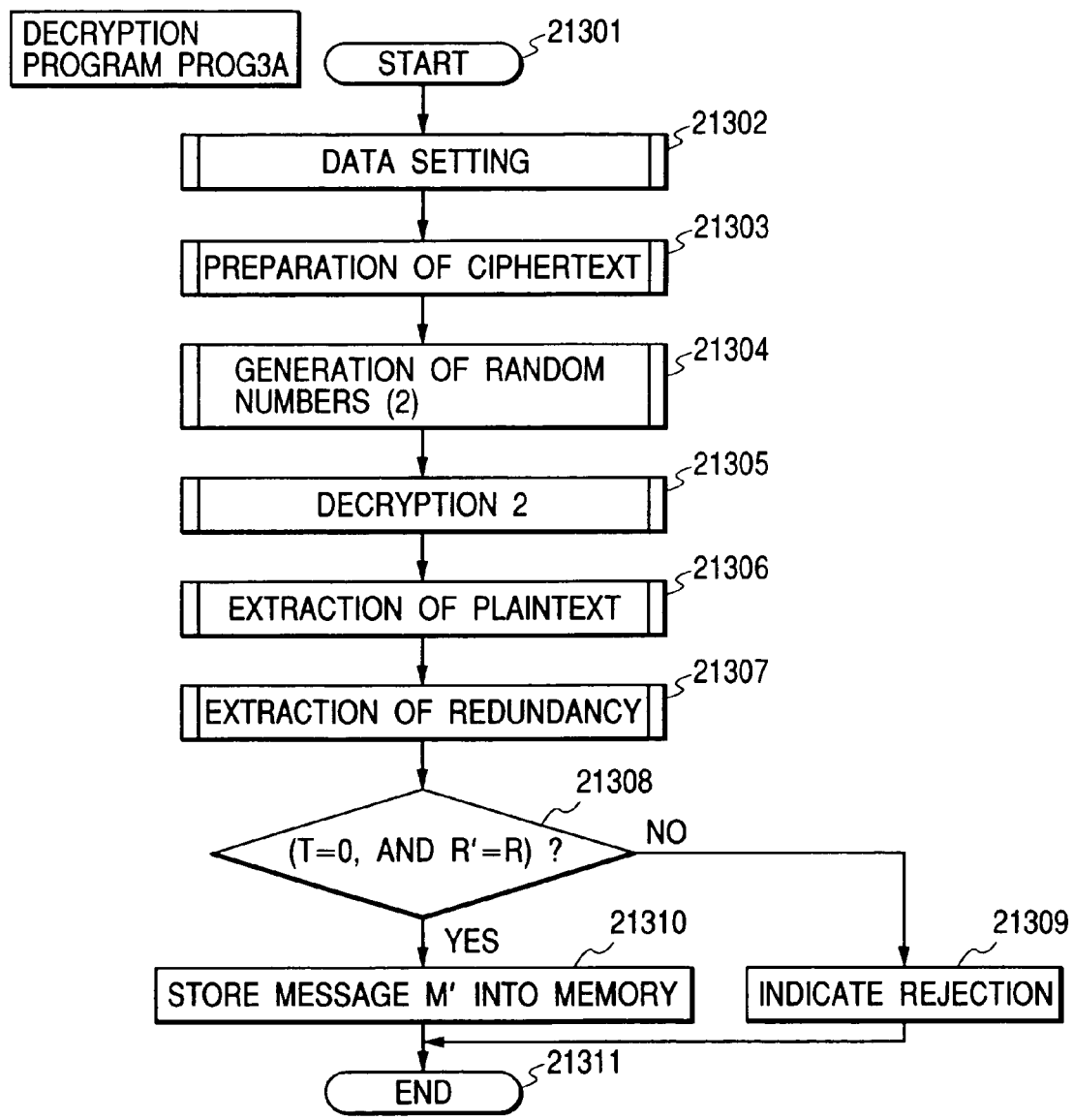
FIG. 14 is a flowchart of the decryption program of the second embodiment.

Description will be made of the process flow of the decryption program PROG3A corresponding to PROG1A with reference to FIG. 14.

The decryption program PROG3A replaces the random number generation subroutine 20504 and the decryption subroutine 20505 employed in the decryption program PROG3_10020 by a random number generation 2 subroutine 21304 and a decryption 2 subroutine 21305, respectively.

Step 21302 (a data setting subroutine): waits for input of the initial value V, the redundancy R, and the secret key K.

Step 21303 (a ciphertext preparation subroutine): waits for input of ciphertext C', and divides the given ciphertext C' into a series of ciphertext blocks $C'_i$ (1≦i≦n) each having 64 bits and outputs them.

Step 21304 (a random number generation subroutine): outputs pseudorandom number sequences $A_i$ (1≦i≦n) and B in response to the secret key K.

Step 21305 (a decryption subroutine): uses the pseudorandom number sequences $A_i$ and B, the series of ciphertext blocks $C'_i$ (1≦i≦n), and the initial value V to output a series of plaintext blocks $P'_i$ (1≦i≦n).

Step 21306 (a plaintext extraction subroutine): combines the series of plaintext blocks $P'_i$ into three data strings L', M', and Z'.

Step 21307 (a redundancy extraction subroutine): divides Z' into R' and T'.

Step 21308: if T=0 and R'=R, proceeds to step 21310.

Step 21309: outputs a rejection indication and proceeds to step 21311.

Step 21310: stores M' into a RAM.

Figure 15:
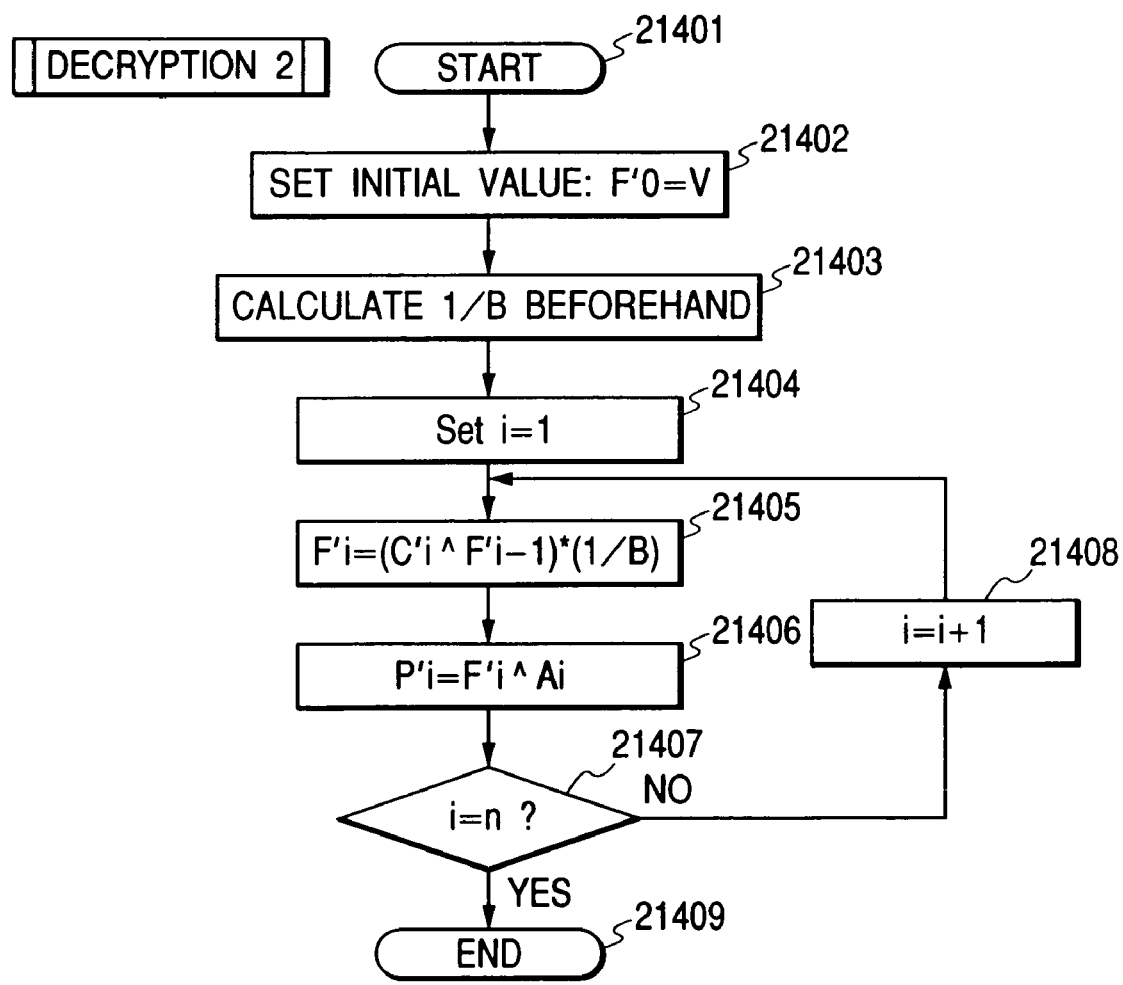
FIG. 15 is a flowchart of the decryption 2 subroutine of the second embodiment.

Description will be made of the process flow of the decryption 2 subroutine 21305 in FIG. 14 with reference to FIG. 15.

Step 21402: sets an initial value $F'_0$ so that $F'_0=V$.

Step 21403: calculates 1/B beforehand.

Step 21404: initializes a counter so that i=1.

Step 21405: calculates a feedback value $F'_i$ by the formula $F'_i = (C'_i \wedge F'_{i-1}) * (1/B)$.

Step 21406: calculates a plaintext block $P'_i$ by the formula $P'_i = F'_i \wedge A_i$.

Step 21407: if i=n, performs step 21409.

Step 21408: increments the counter i and returns to step 21405.

Figure 16:
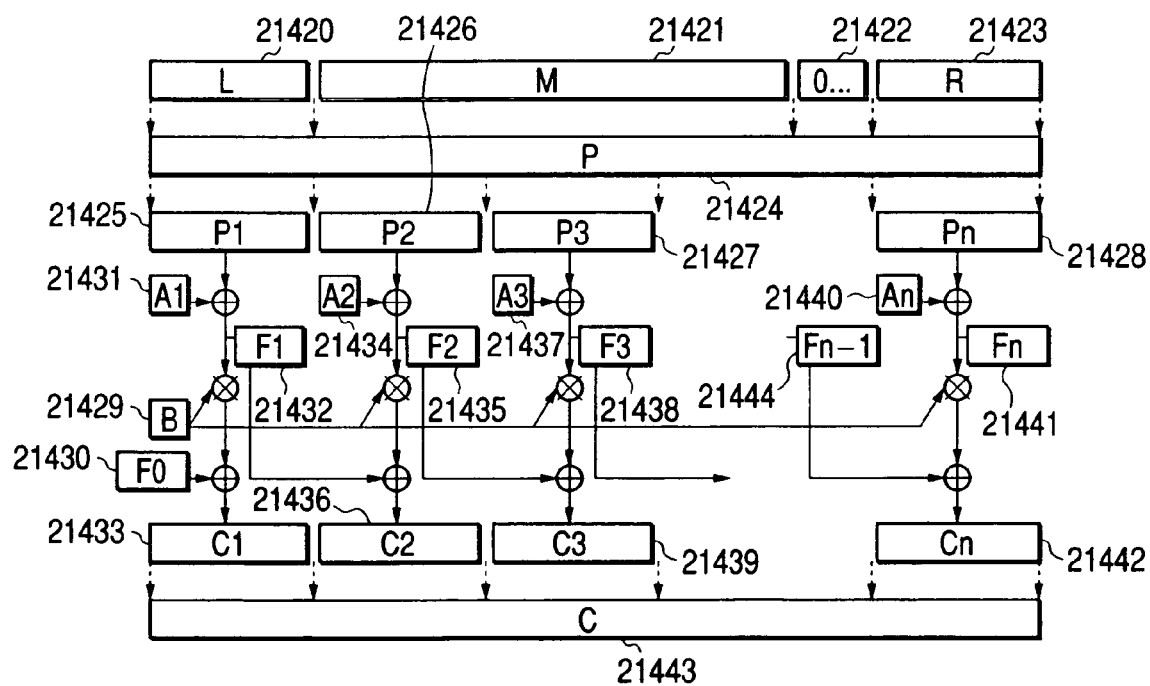
FIG. 16 is a diagram showing data blocks in the encryption according to the second embodiment.

FIG. 16 is an explanatory diagram showing the encryption process employed by the above method of increasing the processing speed.

The message M21421 is added with data 21420 indicating the length, appropriate padding 21422, and a redundancy R21423 to produce plaintext P21424.

The produced plaintext is divided into blocks $P_1\_21425$, $P_2\_21426$, $P_3\_21427$, ..., $P_n\_21428$, each having 64 bits.

$P_1\_21425$ and $A_1\_21431$ are exclusive-ORed to produce a feedback value $F_1\_21432$ which is then multiplied by B_21429 in a finite field. The result is exclusive-ORed with an initial value $F_0\_21430$ to obtain a ciphertext block $C_1\_21433$.

Similarly, $P_2\_21426$ and $A_2\_21434$ are exclusive-ORed to produce a feedback value $F_2\_21435$ which is then multiplied by B_21429 in a finite field. The result is exclusive-ORed with the feedback value $F_1\_21432$ to obtain a ciphertext block $C_2\_21436$.

The above procedure is repeated up to $P_n\_21428$, obtaining ciphertext blocks $C_1\_21433$, $C_2\_21436$, $C_3\_21439$, ..., $C_n\_21442$. The ciphertext blocks are concatenated one after another in that order to obtain ciphertext C_21443.

Figure 17:
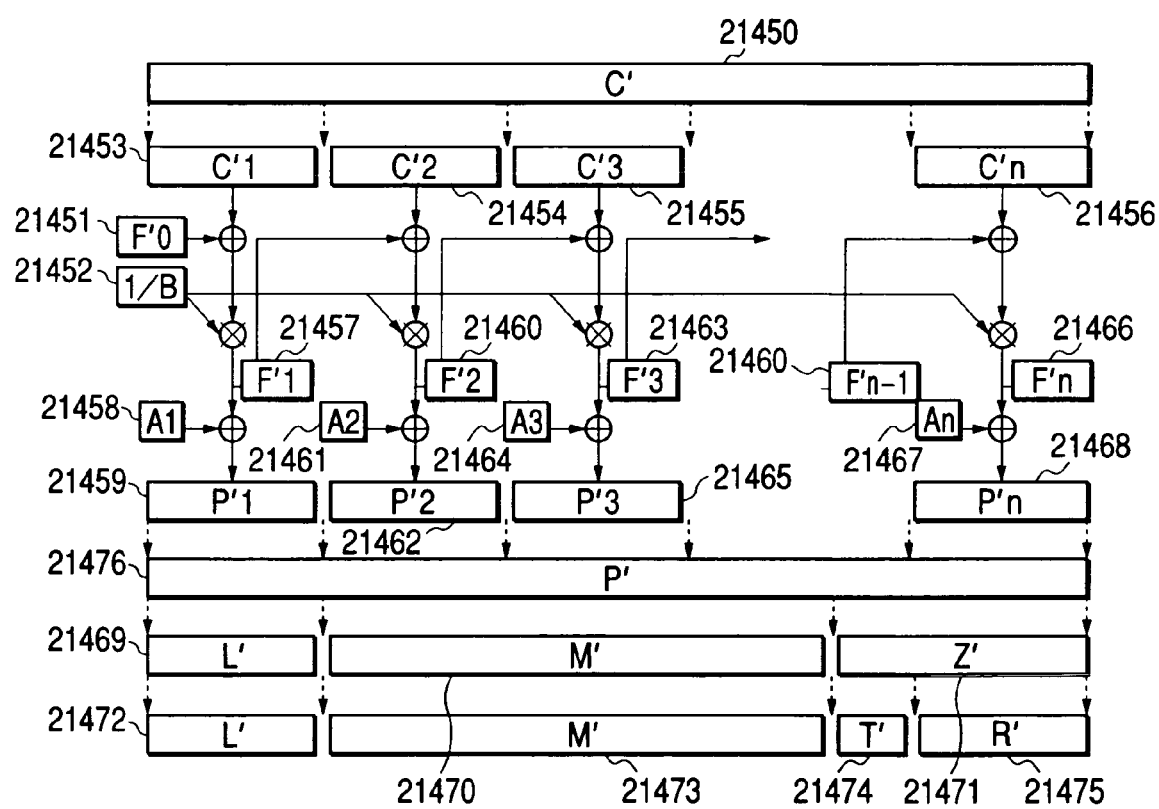
FIG. 17 is a diagram showing data blocks in the decryption according to the second embodiment.

FIG. 17 is an explanatory diagram showing the corresponding decryption process.

Ciphertext C'_21450 is divided into blocks $C'_1\_21453$, $C'_2\_21454$, $C'_3\_21455$, ..., $C'_n\_21456$, each having 64 bits.

$C'_1$ and an initial value $F'_0\_21451$ are exclusive-ORed, and the result is multiplied by 1/B_21452. The multiplication result is set as a feedback value $F'_1\_21457$. The feedback value $F'_1\_21457$ and $A_1\_21458$ are exclusive-ORed to obtain a plaintext block $P'_1\_21459$.

The other blocks $C'_2\_21454$, $C'_3\_21455$, ..., $C'_n\_21456$ are also processed in the same way as $C'_1\_21453$ to obtain plaintext blocks $P'_1\_21459$, $P'_2\_21462$, $P'_3\_21465$, ...

P'$_n$_21468, which are then concatenated one after another to produce plaintext P'_21476. The plaintext P'_21476 is divided into L'_21469, M'_21470, and Z'_21471. Furthermore, Z'_21471 is divided into T'_21474 and R'_21475 so as to check the redundancy R'_21475.

The second embodiment uses a 64-bit redundancy, and therefore employs addition and multiplication in the finite field $F2^{64}$.

With enhanced efficiency provided by this embodiment, it is possible to realize high-speed cryptographic processing. An implementation example written in the C programming language achieved a processing speed of 202 Mbit/sec in encryption processing using a 64-bit processor with a clock frequency of 600 MHz. On the other hand, a processing speed of 207 Mbit/sec was observed in decryption processing.

The above implementation uses such operations as pseudorandom number generation, exclusive OR, and multiplication in the finite field $F2^{64}$, which are efficiently implemented especially by hardware. For example, it is estimated that with a gate array fabricated in a 0.35-μm process, the above operations can be implemented by adding an additional circuit having 3 k gates for the pseudorandom number generator. Furthermore, the pseudorandom number generator can be implemented using parallel processing, making it easy to realize a parallel processing device (including the pseudorandom number generator) having a processing speed as high as required. Thus, it is possible to realize a processing speed of 9.6 Gbit/sec at maximum by adding a circuit having about 36 k gates to a parallel pseudorandom number generator.

Third Embodiment

As described below, a third embodiment of the present invention uses another high-speed processing function to provide processing at higher speed with the same security level as those of the first and the second embodiments. In another aspect, the third embodiment can provide higher security equivalent to $F2^{128}$ if operations in the finite field $F2^{64}$ employed in the first and second embodiments are also used.

In the aspect of providing processing at higher speed described above, the third embodiment uses an operation in the finite field $F2^{32}$ twice. Since multiplication in the field $F2^{64}$ generally requires a computational amount (computational complexity) four times as much as that for the finite field $F2^{32}$, the third embodiment requires only half ((¼)*2) of the computational amount (computational complexity) required by an operation in the finite field $F2^{64}$, actually doubling the processing speed.

In the aspect of enhancing security, the third embodiment can use both an operation in the finite field $F2^{64}$ and a 64-bit feedback value twice to reduce the alteration success rate from $2^{-64}$ of the above method to $2^{-128}$.

The third embodiment employs an encryption program PROG1B and a decryption program PROG3B instead of the encryption program PROG1 and the decryption program PROG3.

Figure 18:
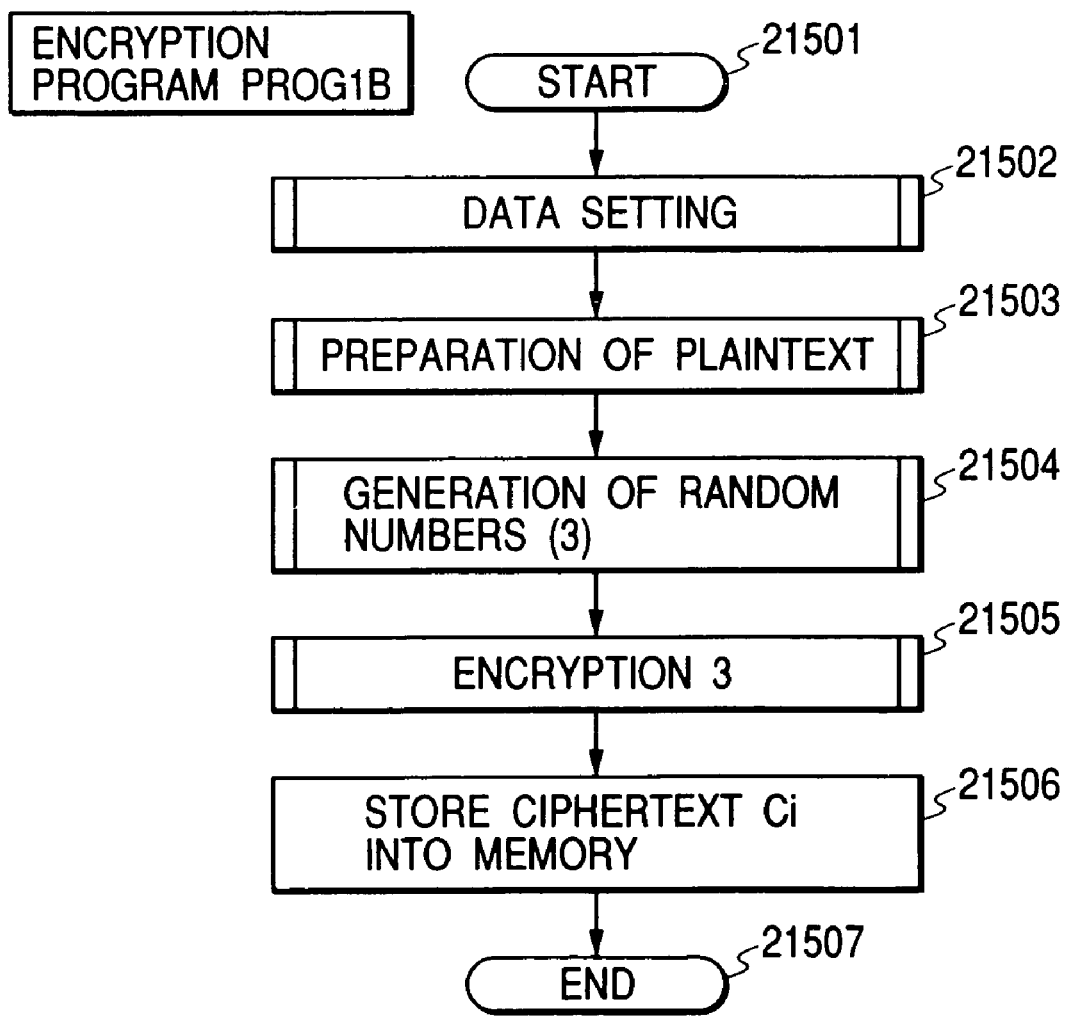
FIG. 18 is a flowchart of the encryption program according to a third embodiment of the present invention.

The encryption program PROG1B replaces the random number generation subroutine (step 20004) and the encryption subroutine (step 20005) employed in the encryption program PROG1_10009 in FIG. 1 by a random number generation 3 subroutine 21504 and an encryption 3 subroutine 21505. Description will be made of the process flow of the encryption program PROG1B with reference to FIG. 18.

Step 21502 (a data setting subroutine): waits for input of an initial value V, a redundancy R, and a secret key K.

Step 21503 (a plaintext preparation subroutine): waits for input of plaintext, adds predetermined padding and a redundancy to the given plaintext, and divides the padded plaintext into a series of plaintext blocks $P_i$ ($1 \leq i \leq n$) each having 32 bits and outputs them.

Step 21504 (random number generation 3 subroutine): outputs pseudorandom number sequences $A_i$ ($1 \leq i \leq n$), Ba, and Bb based on the secret key K.

Step 21505 (encryption 3 subroutine): uses the pseudorandom number sequences $A_i$, Ba, and Bb, the series of plaintext blocks $P_i$ ($1 \leq i \leq n$), and the initial value V to output a series of ciphertext blocks $C_i$ ($1 \leq i \leq n$).

Step 21506: concatenates the series of ciphertext blocks $C_i$ ($1 \leq i \leq n$) obtained at step 21505 one after another sequentially to output ciphertext C.

Figure 19:
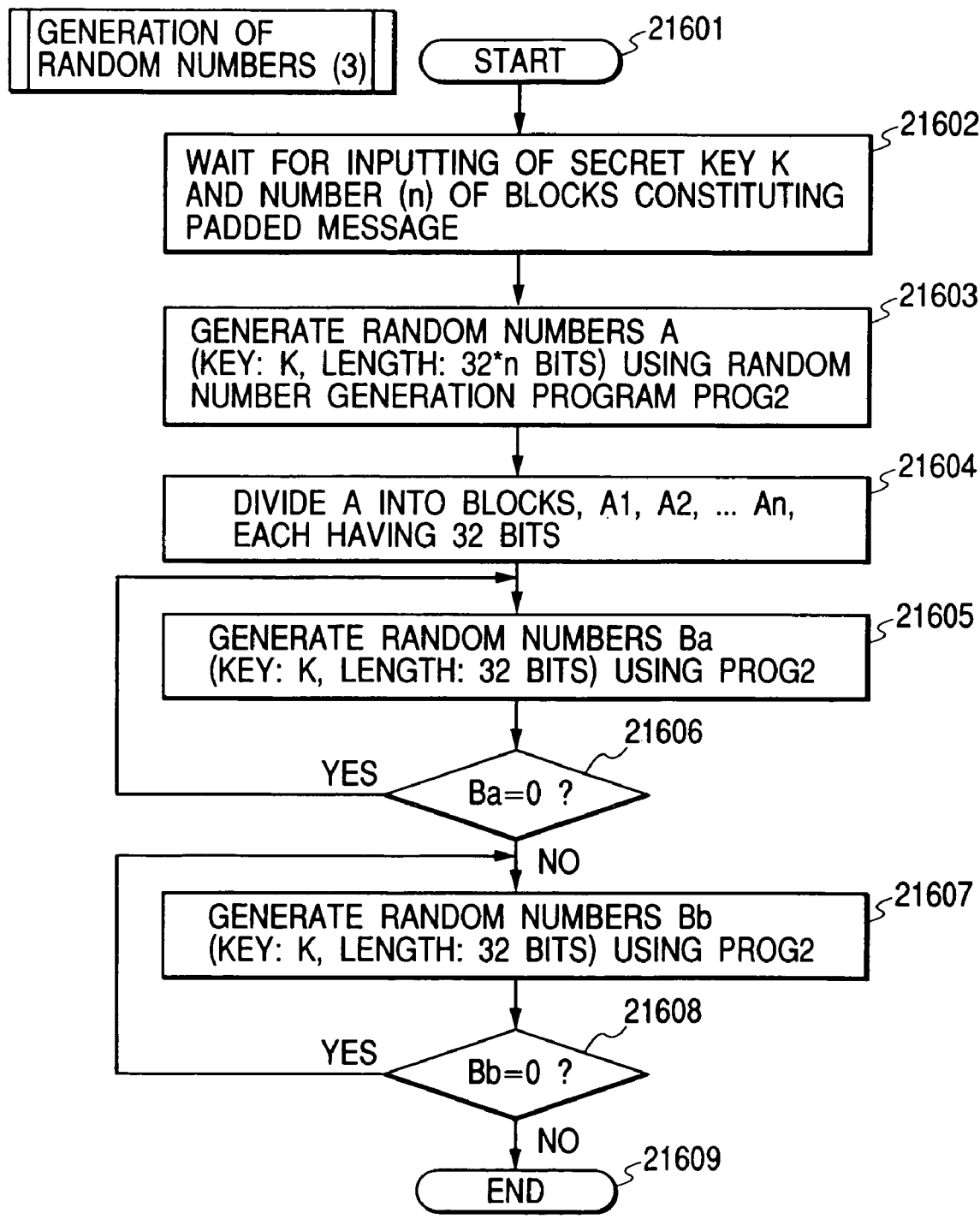
FIG. 19 is a flowchart of the random number generation 3 subroutine of the third embodiment.

Description will be made of the process flow of the random number generation 3 subroutine 21504 with reference to FIG. 19.

Step 21602 (input of necessary parameters): obtains the number n of message blocks making up the padded message and the secret key K.

Step 21603 (generation of pseudorandom number sequence A): calls the random number generation program PROG2 to generate a pseudorandom number sequence having 32*n bits and output it as a pseudorandom number sequence A.

Step 21604 (division of random number sequence A into blocks): divides the pseudorandom number sequence A into blocks $A_1, A_2, \ldots, A_n$, each having 32 bits.

Step 21605 (generation of random number Ba): executes PROG2 using the secret key K to generate a random number Ba having 32 bits.

Step 21606: if the value of the random number Ba generated at step 21605 is 0, returns to step 21605.

Step 21607 (generation of random number Bb): executes PROG2 using the secret key K to generate a random number Bb having 32 bits.

Step 21608: if the value of the random number Bb generated at step 21607 is 0, returns to step 21607.

Figure 20:
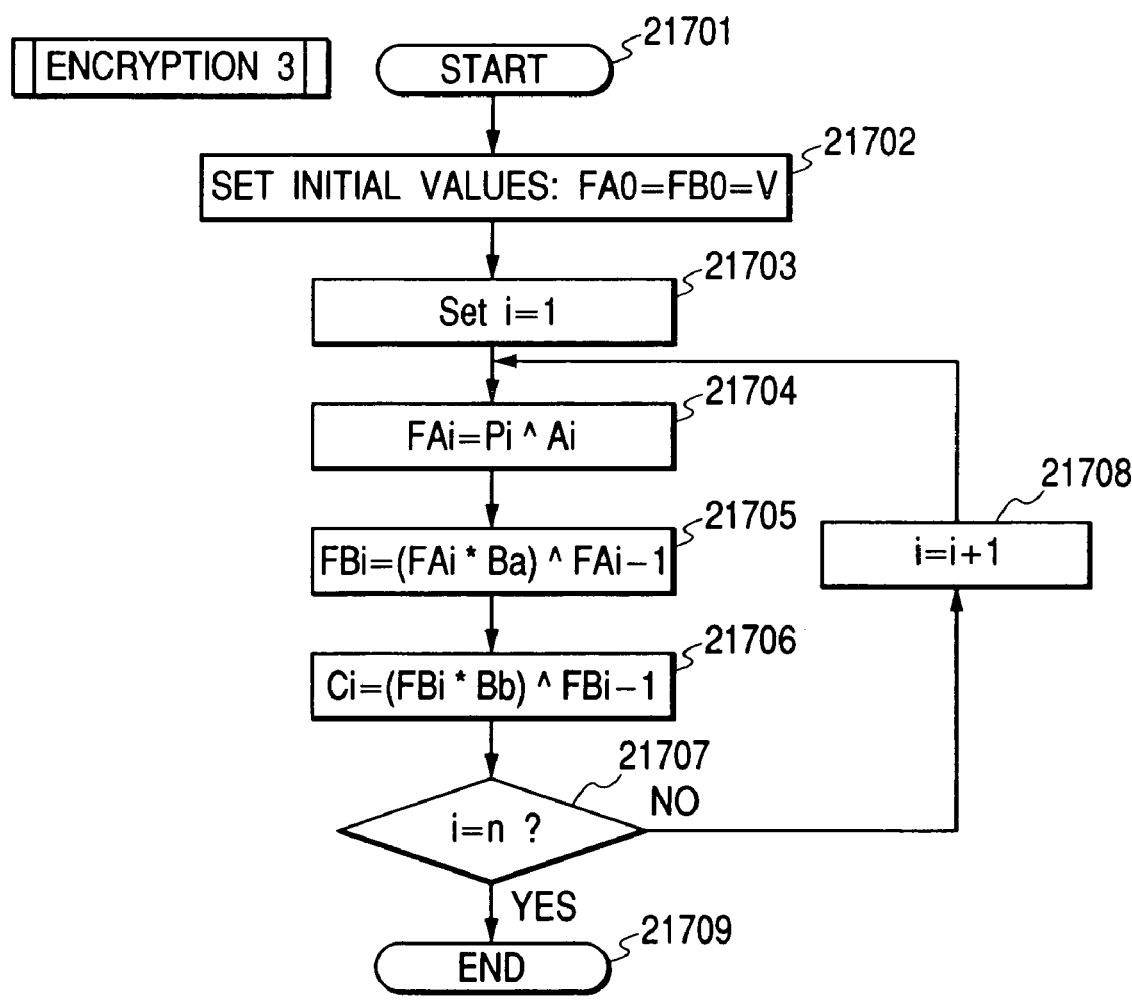
FIG. 20 is a flowchart of the encryption 3 subroutine of the third embodiment.

Description will be made of the process flow of the encryption 3 subroutine 21505 with reference to FIG. 20. The symbols "*" and "^" denote multiplication and addition, respectively, in the finite field $F2^{32}$.

Step 21702: sets initial values $FA_0$ and $FB_0$ so that $FA_0=FB_0=V$.

Step 21703: initializes a counter so that i=1.

Step 21704: calculates a feedback value $FA_i$ by the formula $FA_i=P_i{}^{\wedge}A_i$.

Step 21705: calculates a feedback value $FB_i$ by the formula $FB_i=(FA_i*Ba)^{\wedge}FA_{i-1}$.

Step 21706: calculates a ciphertext block $C_i$ by the formula $C_i=(FB_i*Bb)^{\wedge}FB_{i-1}$.

Step 21707: if i=n, performs step 21709.

Step 21708: increments the counter i and returns to step 21704.

Figure 21:
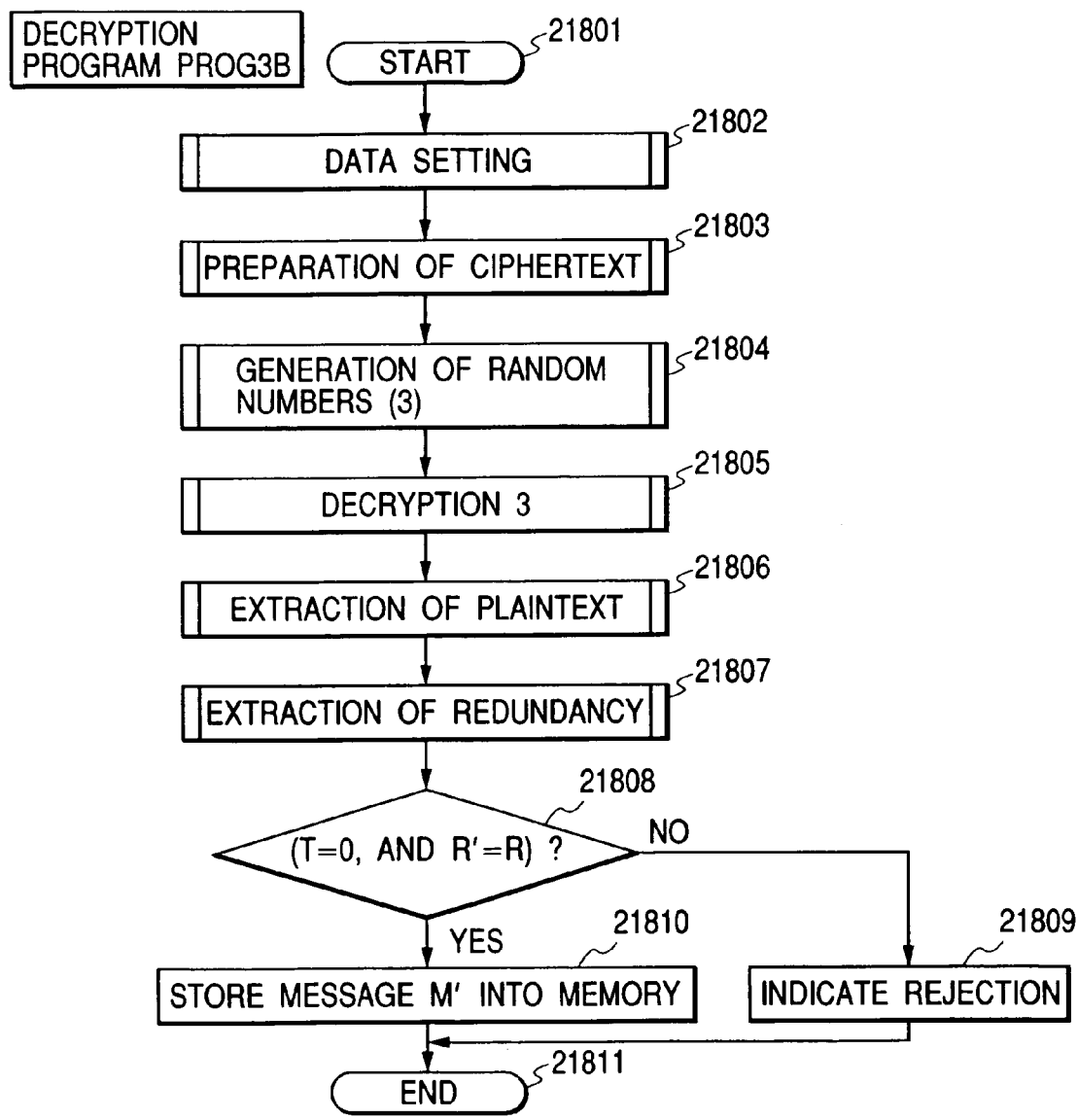
FIG. 21 is a flowchart of the decryption program of the third embodiment.

Description will be made of the process flow of the decryption program PROG3B with reference to FIG. 21. The decryption program PROG3B replaces the random number generation subroutine 20504 and the decryption subroutine 20505 employed in the decryption program PROG3_10020 by a random number generation 3 subroutine 21804 and a decryption 3 subroutine 21805, respectively.

Step 21802 (a data setting subroutine): waits for input of the initial value V, the redundancy R, and the secret key K.

Step 21803 (a ciphertext preparation subroutine): waits for input of ciphertext C', and divides the given ciphertext C' into a series of ciphertext blocks $C'_i$ ($1 \leq i \leq n$) each having 32 bits and outputs them.

Step 21804 (a random number generation subroutine): outputs pseudorandom number sequences $A_i$ ($1 \leq i \leq n$), Ba, and Bb based on the secret key K.

Step 21805 (a decryption subroutine): uses the pseudorandom number sequences $A_i$, Ba, Bb, the series of ciphertext blocks $C'_i$ ($1 \leq i \leq n$), and the initial value V to output a series of plaintext blocks $P'_i$ ($1 \leq i \leq n$)

Step 21806 (a plaintext extraction subroutine): combines the series of plaintext blocks $P'_i$ into three data strings L', M', Z'.

Step 21807 (a redundancy extraction subroutine): divides Z' into R' and T'.

Step 21808: if T=0 and R=R', proceeds to step 21810.

Step 21809: outputs a rejection indication and proceeds to step 21811.

Step 21810: stores M' into a RAM.

Figure 22:
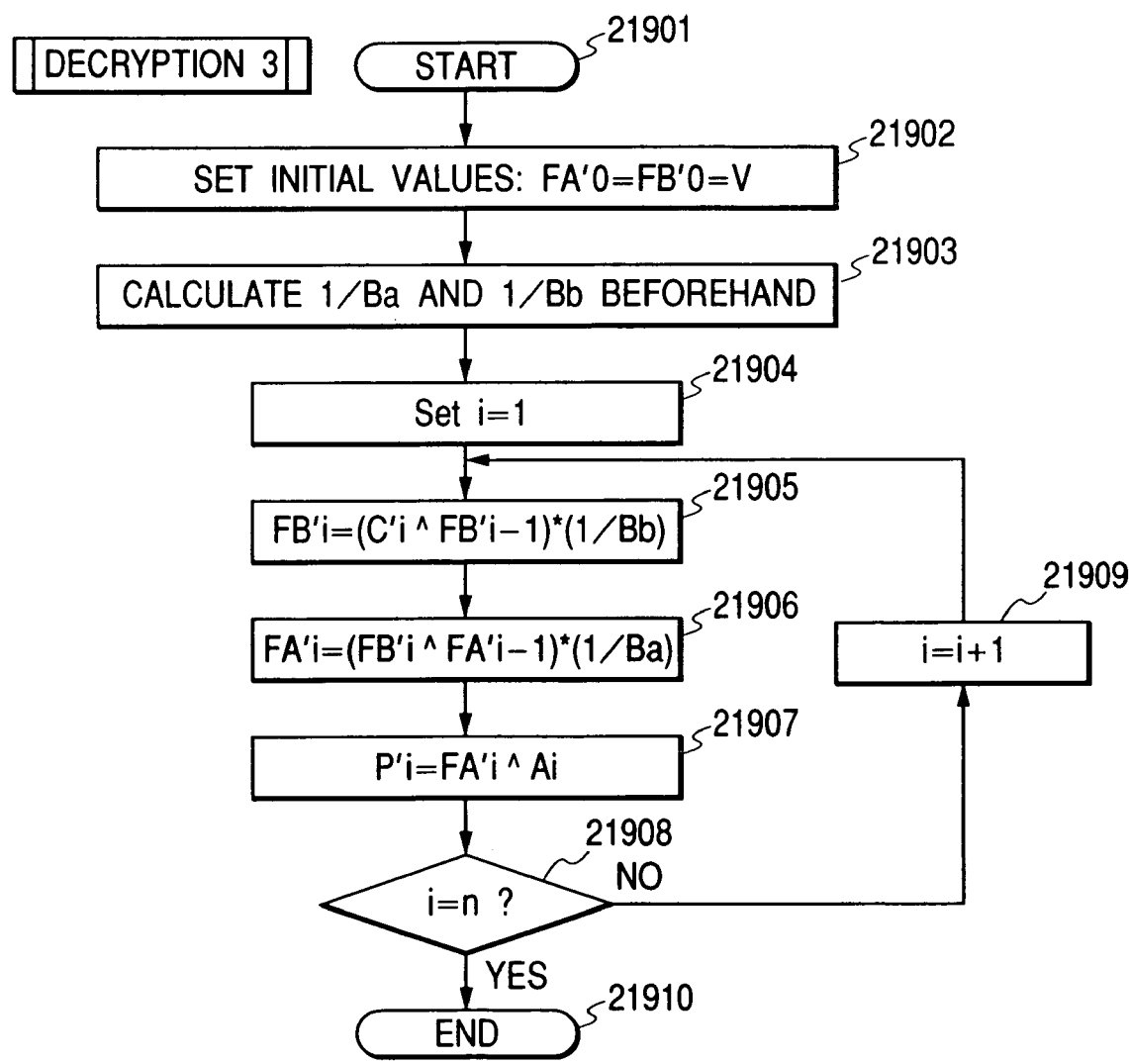
FIG. 22 is a flowchart of the decryption 3 subroutine of the third embodiment.

Description will be made of the process flow of the decryption 3 subroutine 21805 in FIG. 21 with reference to FIG. 22. The symbol "/" denotes division in the finite field $F2^{32}$.

Step 21902: sets initial values $FA'_0$ and $FB'_0$ so that $FA'_0 = FB'_0 = V$.

Step 21903: calculates 1/Ba and 1/Bb beforehand.

Step 21904: initializes a counter so that i=1.

Step 21905: calculates a feedback value $FB'_i$ by the formula $FB'_i = (C'_i \hat{} FB'_{i-1}) * (1/Bb)$ Step 21906: calculates a feedback value $FA'_i$ by the formula $FA'_i = (FB'_i \hat{} FA'_{i-1}) * (1/Ba)$.

Step 21907: calculates a plaintext block $P'_i$ by the formula $P'_i = FA'_i \hat{} A_i$.

Step 21908: if i=n, performs step 21910.

Step 21909: increments the counter i and returns to step 21905.

Figure 23:
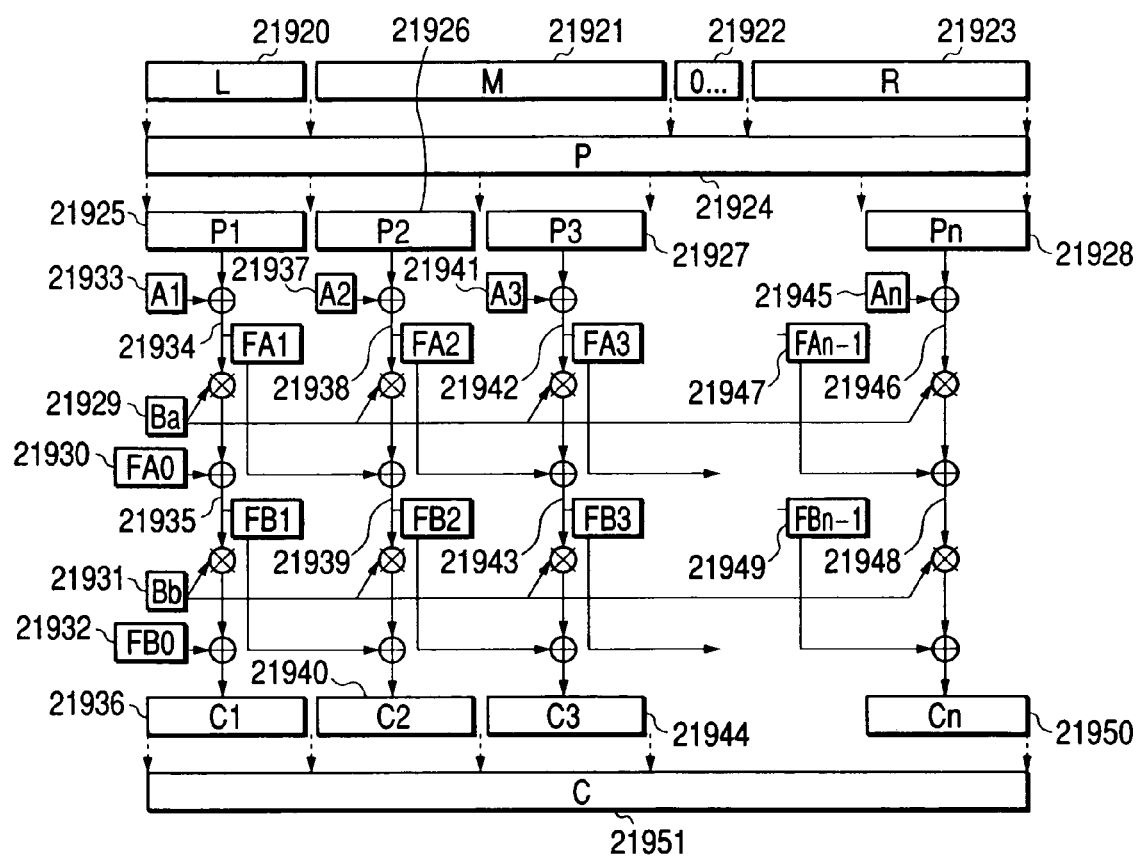
FIG. 23 is a diagram showing data blocks in the encryption according to the third embodiment.

FIG. 23 is an explanatory diagram showing the encryption process employed by the above method of increasing the processing speed.

The message M21921 is added with data L21920 indicating the length, appropriate padding 21922, and a redundancy R21923 to produce plaintext P21924.

The produced plaintext P21924 is divided into blocks $P_{1\_}21925$, $P_{2\_}21926$, $P_{3\_}21927$, ..., $P_{n\_}21928$, each having 32 bits.

$P_{1\_}21925$ and $A_{1\_}21933$ are exclusive-ORed to produce a feedback value $FA_{1\_}21934$ which is then multiplied by Ba_21929 in a finite field. The result is exclusive-ORed with an initial value $FA_{0\_}21930$ to obtain a feedback value $FB_{1\_}21935$. The obtained feedback value $FB_{1\_}21935$ is multiplied by Bb_21931 in a finite field, and the multiplication result is exclusive-ORed with an initial value $FB_{0\_}21932$ to obtain a ciphertext block $C_{1\_}21936$.

Similarly, $P_{2\_}21926$ and $A_{2\_}21937$ are exclusive-ORed to produce a feedback value $FA_{2\_}21938$ which is then multiplied by Ba_21929 in a finite field. The result is exclusive-ORed with the feedback value $FA_{1\_}21934$ to obtain an feedback value $FB_{2\_}21939$. The obtained $FB_{2\_}21939$ is multiplied by Bb_21931 in a finite field, and the multiplication result is exclusive-ORed with the feedback value $FB_{1\_}21935$ to obtain a ciphertext block $C_{2\_}21940$.

The above procedure is repeated up to $P_{n\_}21928$, obtaining ciphertext blocks $C_{1\_}21936$, $C_{2\_}21940$, $C_{3\_}21944$, ..., $C_{n\_}21950$. The ciphertext blocks are concatenated one after another in that order to obtain ciphertext C_21951.

Figure 24:
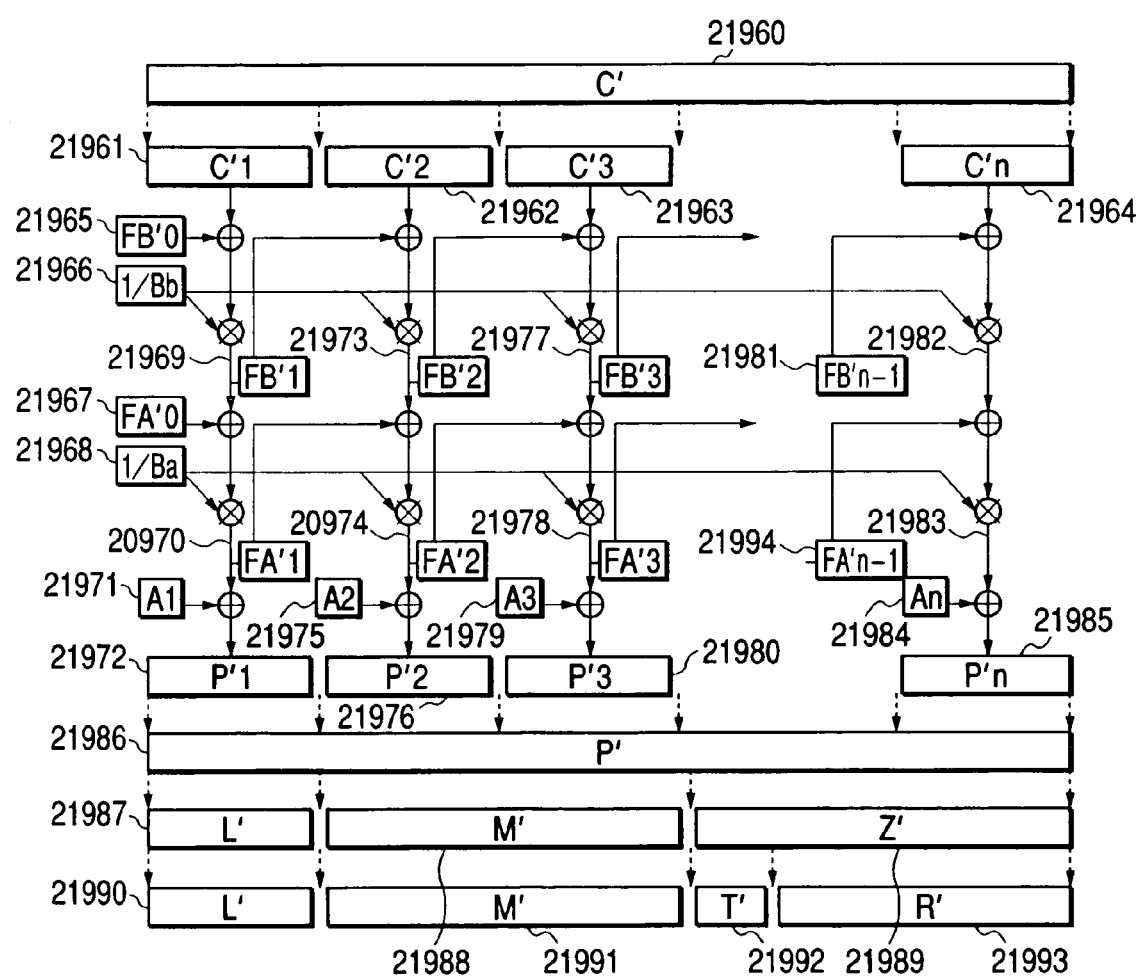
FIG. 24 is a diagram showing data blocks in the decryption according to the third embodiment.

FIG. 24 is an explanatory diagram showing the corresponding decryption process.

Ciphertext C'_21960 is divided into blocks $C'_{1\_}21961$, $C'_{2\_}21962$, $C'_{3\_}21963$, ..., $C'_{n\_}21964$, each having 32 bits.

$C'_1$ and an initial value $FB'_{0\_}21965$ are exclusive-ORed, and the result is multiplied by 1/Bb_21966. The multiplication result is set as a feedback value $FB'_{1\_}21969$. The feedback value $FB'_{1\_}21969$ is exclusive-ORed with an initial value $FA'_{0\_}21967$, and the result is multiplied by 1/Ba_21968 to generate a feedback value $FA'_{1\_}21970$. The feedback value $FA'_{1\_}21970$ is exclusive-ORed with $A_{1\_}21971$ to obtain a plaintext block $P'_{1\_}21972$.

The other blocks $C'_{2\_}21962$, $C'_{3\_}21963$, ..., $C'_{n\_}21964$ are also processed in the same way as $C'_{1\_}21961$ to obtain plaintext blocks $P'_{1\_}21972$, $P'_{2\_}21976$, $P'_{3\_}21980$, ..., $P'_{n\_}21985$, which are then concatenated one after another to produce plaintext P'_21986. The plaintext P'_21986 is divided into L'_21897, M'_21988, and Z'_21989. Furthermore, Z'_21989 is divided into T'_21992 and R'_21993 so as to check the redundancy R'_21993.

Fourth Embodiment

As described below, a fourth embodiment of the present invention provides a cryptographic method capable of properly starting encryption/decryption processing without using information on the length of a message to be processed. Accordingly, the fourth embodiment makes it possible to perform cryptographic processing of data (message) of a stream type, whose entire length is not known beforehand.

The fourth embodiment replaces the random number generation 2 subroutine and the plaintext preparation subroutine in the encryption program PROG1A, and the decryption program PROG3A employed in the second embodiment by a random number generation 4 subroutine, a plaintext preparation 2 subroutine, and a decryption program PROG6, respectively.

Figure 29:
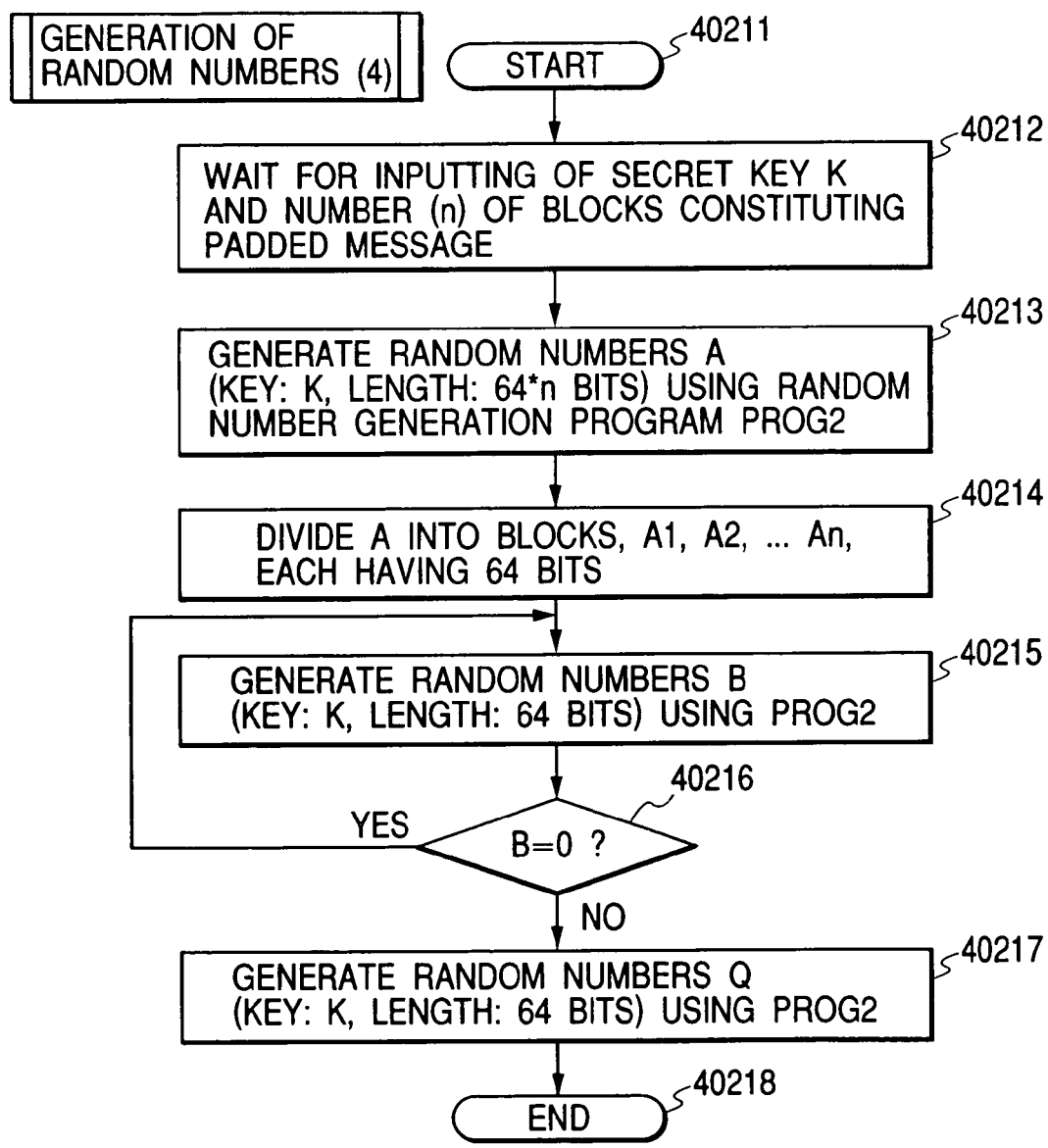
FIG. 29 is a flowchart of the random number generation 4 subroutine according to a fourth embodiment of the present invention.

Description will be made of the process flow of the random number generation 4 subroutine with reference to FIG. 29.

Step 40212 (input of necessary parameters): obtains the number n of message blocks making up a padded message, and a secret key K.

Step 40213 (generation of pseudorandom number sequence A): calls the random number generation program PROG2 to generate a pseudorandom number sequence having 64*n bits and output it as a pseudorandom number sequence A.

Step 40214 (division of pseudorandom number sequence A into blocks): divides the pseudorandom number sequence A into blocks $A_1, A_2, \ldots A_n$, each having 64 bits.

Step 40215 (generation of random number B): executes PROG2 using the secret key K to generate a random number B having 64 bits.

Step 40216: if the value of B generated at step 40215 is 0, returns to step 40215.

Step 40217 (generation of random number Q): executes PROG2 using the secret key K to generate a random number Q having 64 bits.

Figure 30:
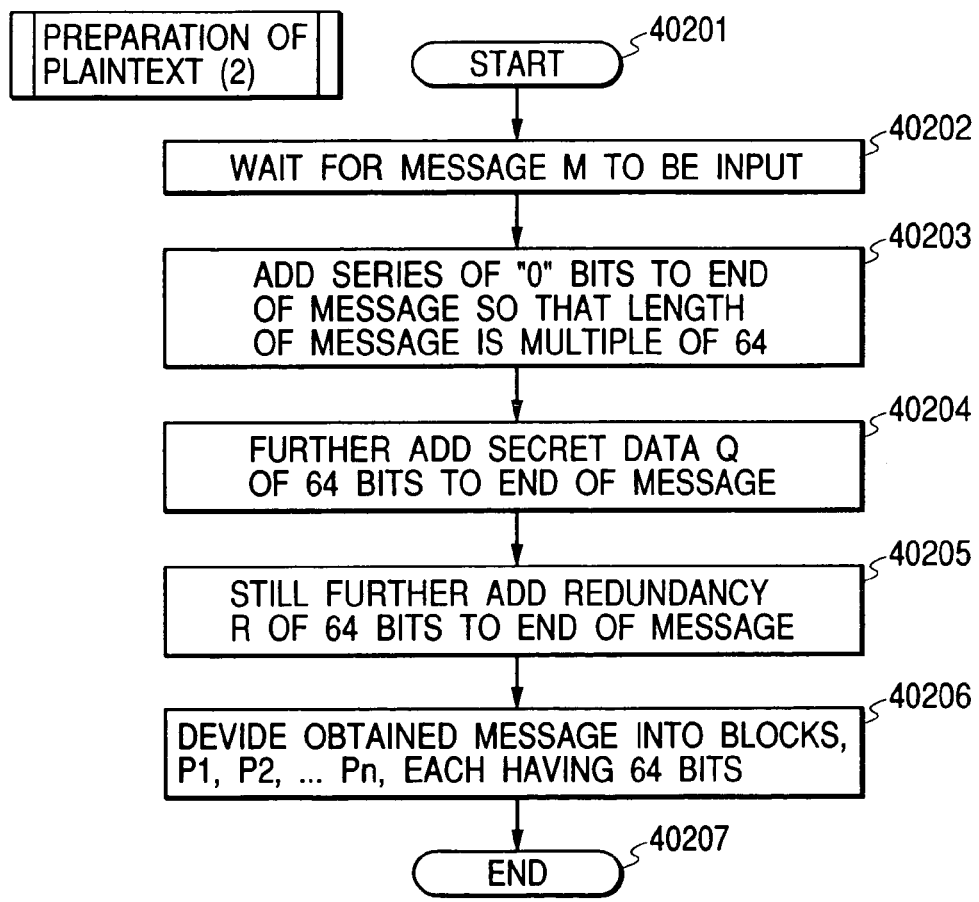
FIG. 30 is a flowchart of the plaintext preparation 2 subroutine of the fourth embodiment.
Figure 31:
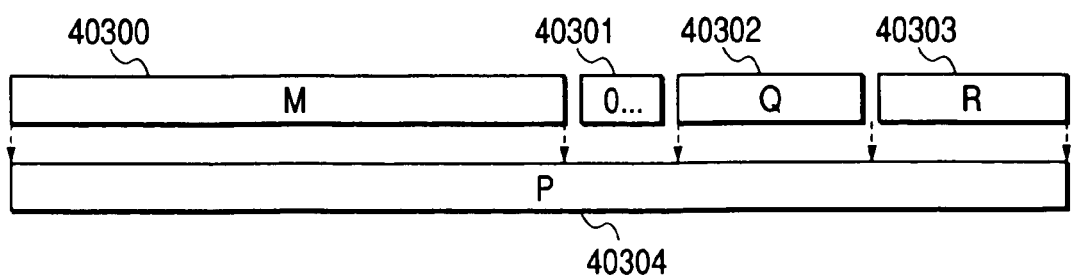
FIG. 31 is an explanatory diagram showing a padding operation on a message according to the fourth embodiment.

Next, description will be made of the process flow of the plaintext preparation 2 subroutine with reference to FIGS. 30 and 31.

Step 40202: waits for input of an encryption-target message M40300. The message is either input from the keyboard 10008 or read out from a RAM, or introduced from another medium.

Step 40203: adds padding to the message so that the length of the message is a multiple of a predetermined number. Specifically, the padded data (message) is set to have an integer multiple of 64 bits for subsequent processing. When the length of the message M40300 is L bits, this step adds (64−L(mod 64)) number of 0s to the end of the message M40300.

Step 40204 (addition of secret data): further adds 64-bit secret data Q40302 to the end of the message M40300. The secret data Q40302 can be known by only a person who holds or has obtained its key (or the key data). The secret data may be a random number generated from the secret key K. The above step 40217 performs this process of generating secret data.

Step 40205 (addition of redundancy data): still further adds a redundancy R40303 of 64 bits to the end of the message M40300.

Step 40206 (division of message data into plaintext blocks): divides the data P40304 (the padded message) obtained at step 40205 into blocks $P_1, P_2, \ldots, P_n$ each having 64 bits.

Figure 32:
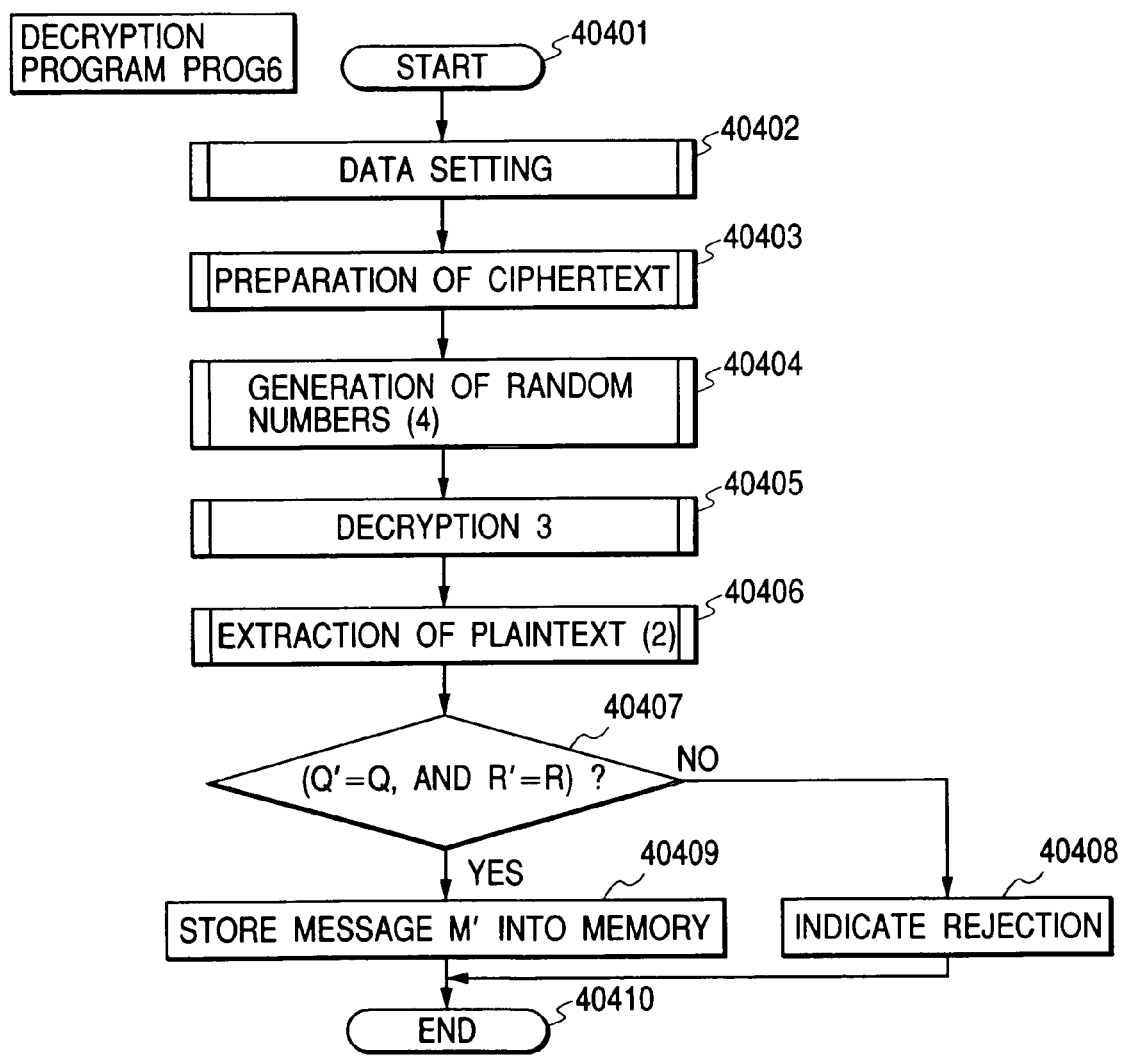
FIG. 32 is a flowchart of the decryption program of the fourth embodiment.
Figure 34:
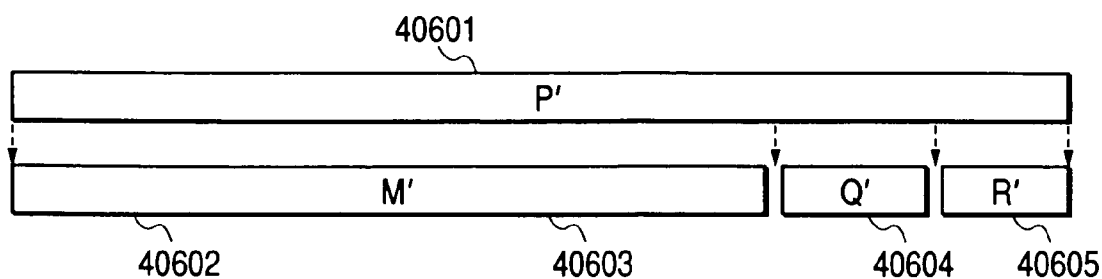
FIG. 34 is an explanatory diagram showing an extraction operation on decrypted text according to the fourth embodiment.

Description will be made of the process flow of the decryption program PROG6 with reference to FIGS. 32 and 34.

Step 40402 (a data setting subroutine): waits for input of the initial value V, the redundancy R, and the secret key K.

Step 40403 (a ciphertext preparation subroutine): waits for input of ciphertext C', and divides the given ciphertext C' into a series of ciphertext blocks $C'_i$ ($1 \leq i \leq n$) each having 32 bits and outputs them.

Step 40404 (random number generation 4 subroutine): outputs pseudorandom number sequences $A_i$ ($1 \leq i \leq n$) and B based on the secret key K.

Step 40405 (decryption 3 subroutine): uses the pseudorandom number sequences $A_i$, B, and Q, the series of the ciphertext blocks $C'_i$ ($1 \leq i \leq n$), and the initial value V to output a series of plaintext blocks $P'_i$ ($1 \leq i \leq n$).

Step 40406 (plaintext extraction 2 subroutine): combines the series of plaintext blocks P'40601 into three data strings M'40602, Q'40603, and R'40604.

Step 40407: if Q'40603=Q40302 and R'40604=R40303, proceeds to step 40409.

Step 40408: outputs a rejection indication and proceeds to step 40410.

Step 40409: stores M' into a RAM.

Step 40410: ends the process.

Figure 33:
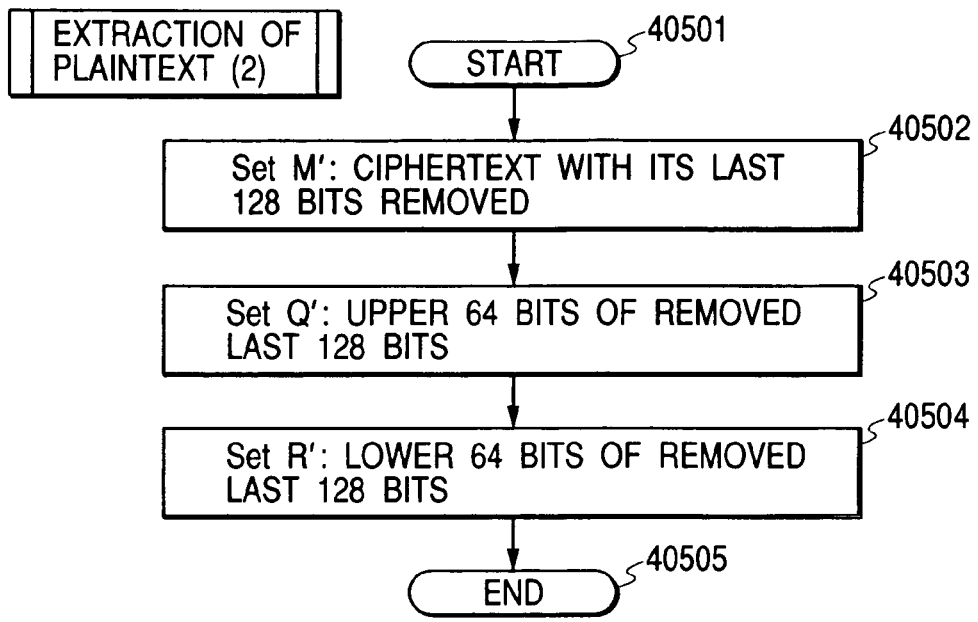
FIG. 33 is a flowchart of the plaintext extraction 2 subroutine shown in FIG. 32.

Next, description will be made of the process flow of the plaintext extraction 2 subroutine with reference to FIG. 33.

Step 40502: removes the last 128 bits of the decrypted plaintext, and sets a plaintext block M' to the remaining decrypted text.

Step 40503: sets Q' to the upper 64 bits of the removed last 128 bits obtained at step 40502.

Step 40504: sets R' to the lower 64 bits of the removed last 128 bits.

Fifth Embodiment

The above first through fourth embodiments of the present invention have a single-processor configuration, that is, they do not employ parallel processing. A fifth embodiment of the present invention, however, shows that the present invention can be easily applied to parallel processing.

The system configuration (not shown) of the fifth embodiment is different from that shown in FIG. 1 in that the computer A10002 employs both a CPU 1_30004 and a CPU 2_30005 instead of the CPU 10004, and the RAM 10005 stores a parallel encryption program PROG4_30016 in addition to the components shown in FIG. 1. Furthermore, the computer B10003 employs both a CPU 1_30017 and a CPU 2_30018 instead of the CPU 10015, and the RAM 10016 stores a parallel decryption program PROG5_30025 in addition to the components shown in FIG. 1.

The computer A10002 executes the parallel encryption program PROG4_30016 to generate ciphertext C10022 from a message M10014 and transmit the generated ciphertext C10022. Receiving the ciphertext C10022, the computer B10003 executes the parallel decryption program PROG5_30025, and if no alteration is detected, the computer B10003 stores the decryption results into the RAM 10016.

The CPUs 1_30004 and 2_30005 implement the parallel encryption program PROG4_30016 by executing the program read out from the RAM 10005 in the computer A10002. The parallel encryption program PROG4_30016 internally calls and executes the encryption program PROG1_10009 and the random number generation program PROG2_10010 as its subroutines.

The CPUs 1_30017 and 2_30018 executes the parallel decryption program PROG5_30025 read out from the RAM 10016 in the computer B10003. The parallel decryption program PROG5_30025 calls and executes the decryption program PROG3_10020 and the random number generation program PROG2_10021 as its subroutines.

The other configurations and operations of the system are the same as those shown in FIG. 1.

Figure 25:
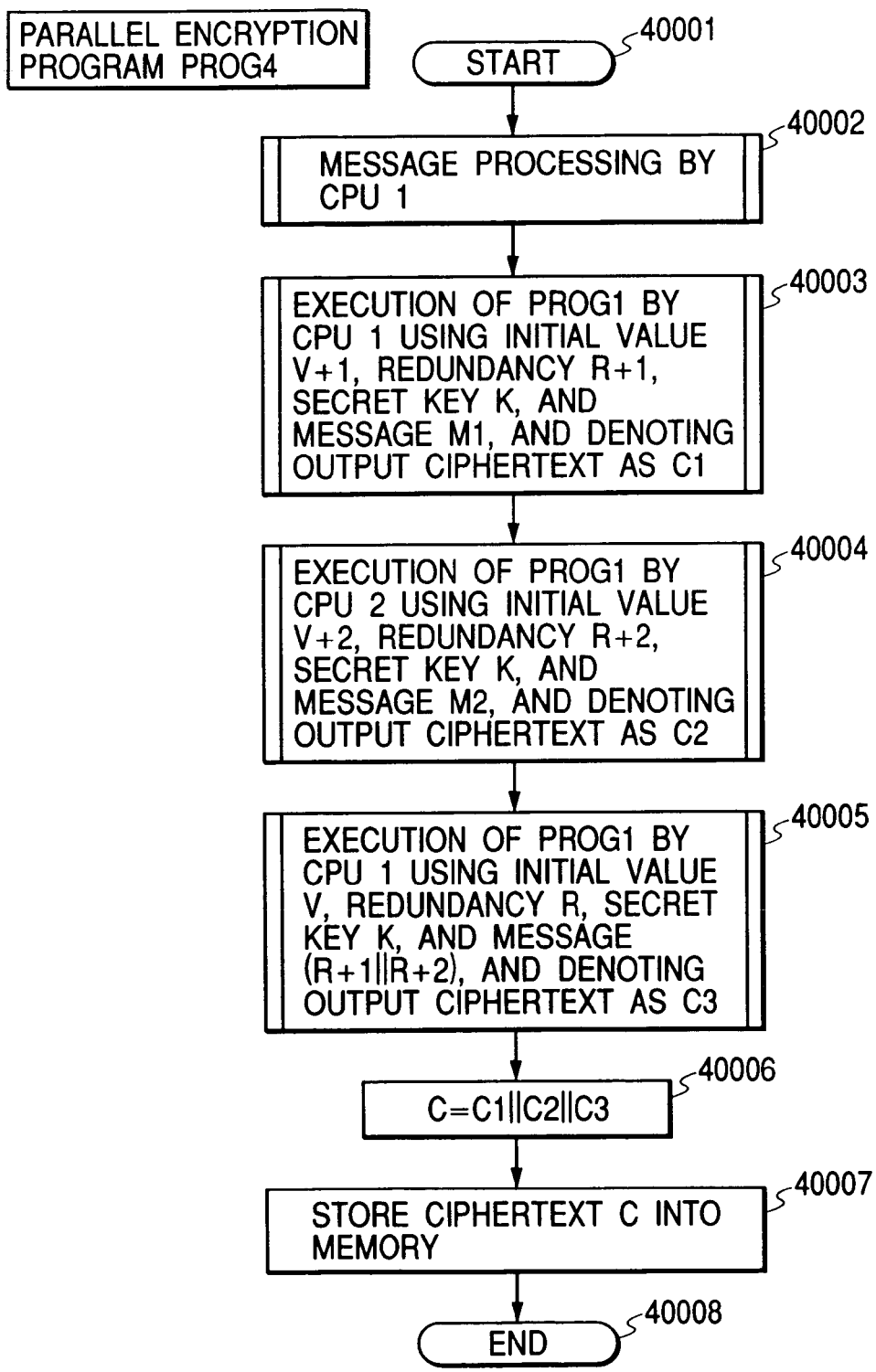
FIG. 25 is a flowchart of the parallel encryption program according to a fifth embodiment of the present invention.

Description will be made of the process flow of the parallel encryption program PROG4_30016 with reference to FIG. 25. The expression "A∥B" denotes concatenation of two bit-strings A and B.

Step 40002: divides a message M into two parts, $M_1$ and $M_2$, in message processing performed by the CPU 1.

Step 40003: uses an initial value V+1, a redundancy R+1, a secret key K, and the plaintext $M_1$ to output ciphertext $C_1$ in encryption processing by the encryption program PROG1_10009 executed by CPU 1.

Step 40004: uses an initial value V+2, a redundancy R+2, the secret key K, and the plaintext $M_2$ to output ciphertext $C_2$ in encryption processing by the encryption program PROG1_10009 executed by CPU 2.

Step 40005: uses an initial value V, a redundancy R, the secret key K, and plaintext ($R_1 \| R_2$) to output ciphertext $C_3$ in encryption processing by the encryption program PROG1_10009 executed by CPU 1.

Step 40006: generates ciphertext C ($C = C_1 \| C_2 \| C_3$).

Step 40007: stores the ciphertext C into a memory.

Figure 26:
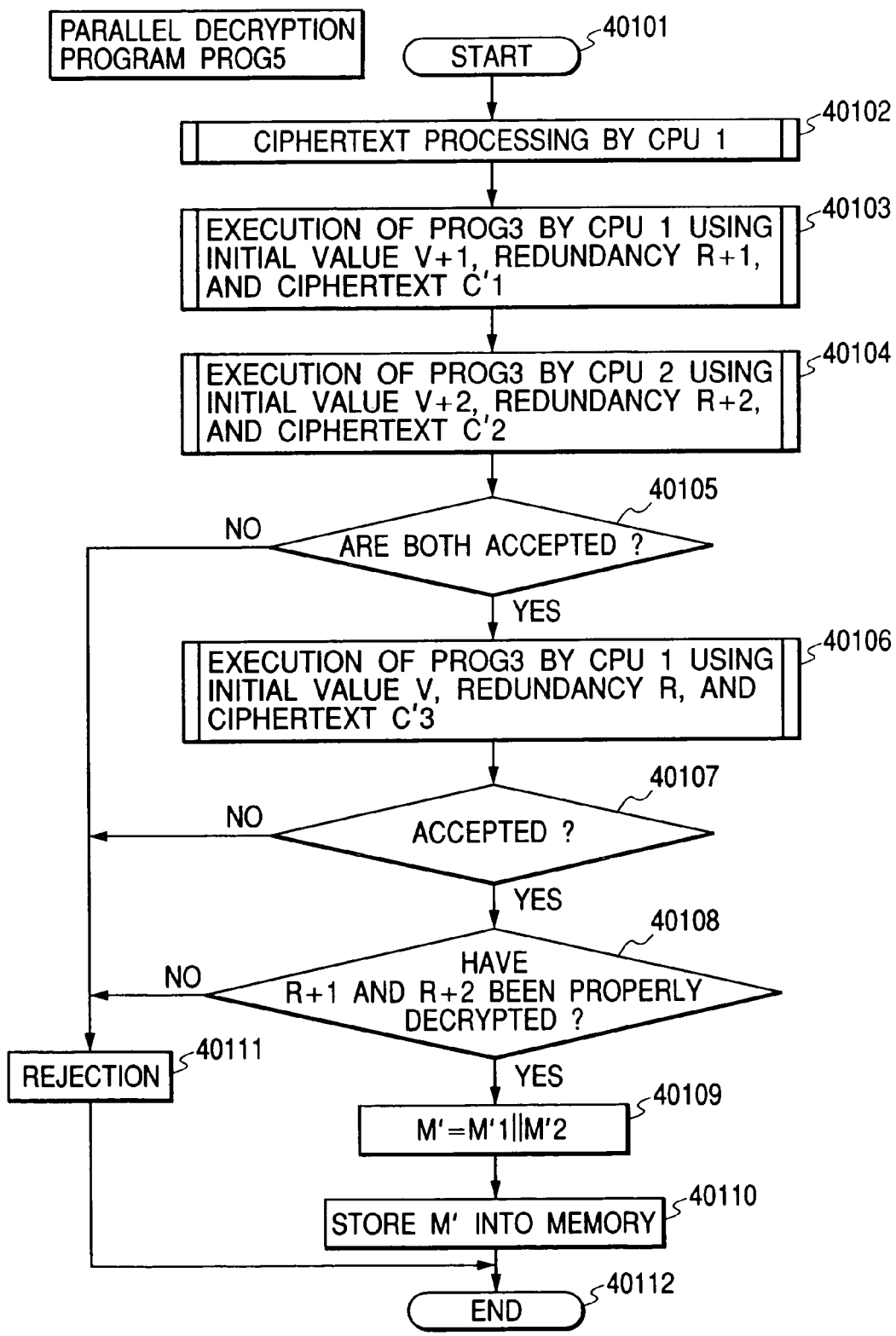
FIG. 26 is a flowchart of the parallel decryption program of the fifth embodiment.

Description will be made of the process flow of the parallel decryption program PROG5_30025 with reference to FIG. 26.

Step 40102: divides ciphertext C' into three parts, $C'_1$, $C'_2$, and $C'_3$. $C'_3$ has 192 bits, and $C'_1$ and $C'_2$ has the same length, where $C' = C'_1 \| C'_2 \| C'_3$.

Step 40103: uses the initial value V+1 and the secret key K to decrypt the ciphertext block $C'_1$ into a message block $M'_1$ and the redundancy R+1 in decryption processing by the decryption program PROG3_10020 executed by the CPU 1, and stores the message block $M'_1$ and the redundancy R+1.

Step 40104: uses the initial value V+2 and the secret key K to decrypt the ciphertext block $C'_2$ into a message block $M'_2$ and the redundancy R+2 in decryption processing by the decryption program PROG3_10020 executed by CPU 2, and stores the message block $M'_2$ and the redundancy R+2.

Step 40105: if at least one of the decryption results obtained at steps 40103 and 40104 is a reject, performs step 40111.

Step 40106: uses the initial value V and the secret key K to decrypt the ciphertext block $C'_3$ into a block and the redundancy R in decryption processing by the decryption program PROG3_10020 executed by the CPU1, and stores the decryption result (the decrypted block) and the redundancy R.

Step 40107: if the decryption results obtained at step 40106 is a reject, performs step 40111.

Step 40108: if the decrypted block obtained at step 40106 is not equal to (R+1)||(R+2), performs step 40111.

Step 40109: lets M'=M'$_1$||M'$_2$ (M': decryption result)

Step 40110: stores M' into a memory and performs step 40112.

Step 40111: outputs a rejection indication.

As described above, the fifth embodiment can provide parallel cryptographic processing using two separate processors.

Figure 27:
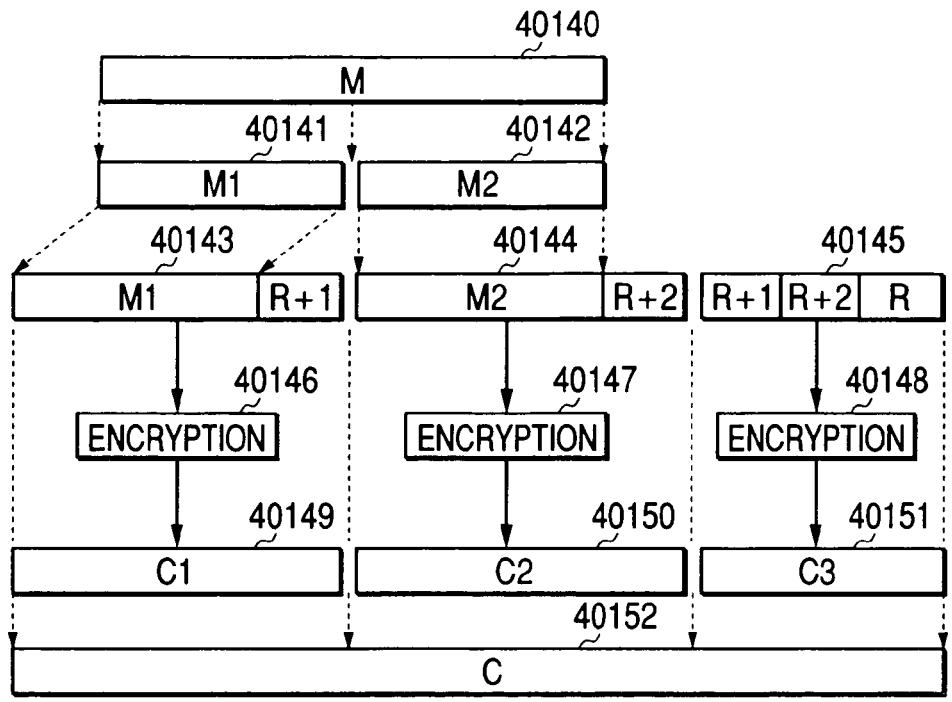
FIG. 27 is a diagram showing data blocks in the encryption according to the fifth embodiment.

FIG. 27 is an explanatory diagram showing the encryption process employed by the above parallel cryptographic processing method.

$M_1$_40141 and $M_2$_40142 obtained as a result of dividing a message M40140 are added with redundancies R+1 and R+2, respectively, and denoted as blocks 40143 and 40144. The blocks 40143 and 40144 are encrypted by use of encryption processes 40146 and 40147 to obtain ciphertext blocks $C_1$_40149 and $C_2$_40150, respectively. Further, a combination of the redundancies R+1 and R+2, which is set as a message, and another redundancy R are encrypted to obtain a ciphertext block $C_3$_40151.

The ciphertext blocks $C_1$_40149, $C_2$_40150, and $C_3$_40151 are concatenated one after another to output ciphertext C40152.

Figure 28:
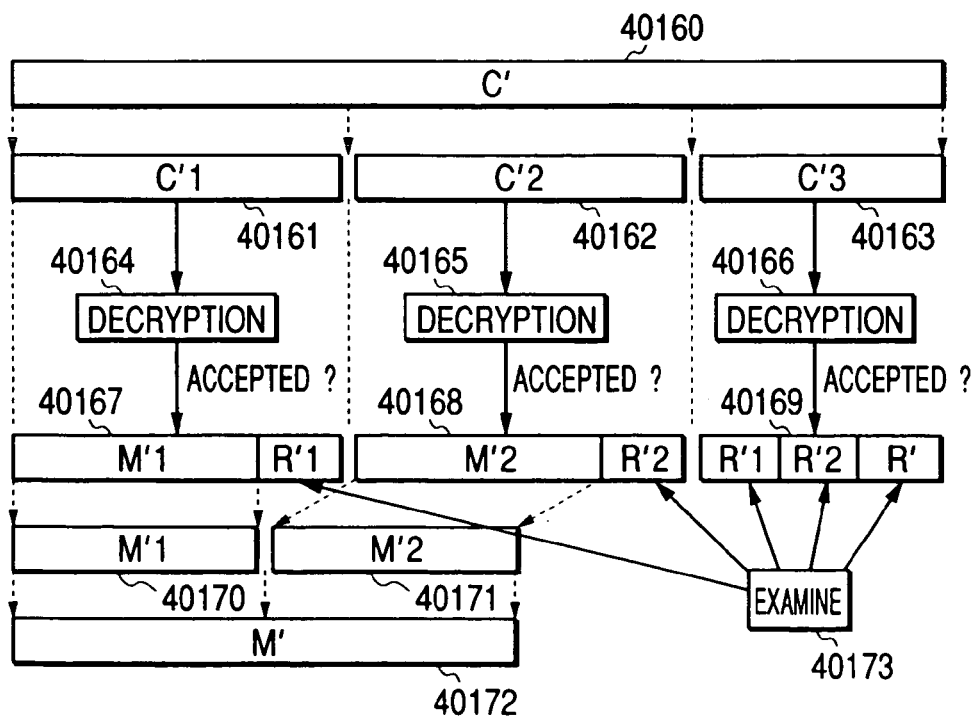
FIG. 28 is a diagram showing data blocks in the decryption according to the fifth embodiment.

FIG. 28 is an explanatory diagram showing the corresponding parallel decryption process.

Ciphertext C'40160 is divided into three blocks, $C'_1$_40161, $C'_2$_40162, and $C'_3$_40163.

The obtained blocks $C'_1$_40161, $C'_2$_40162, and $C'_3$_40163 are decrypted by decryption processes 40164, 40165, and 40166 to obtain plaintext blocks 40167, 40168, and 40169, respectively.

If the obtained plaintext blocks are accepted, and the redundancies included in the plaintext blocks 40167 and 40168 are identical to the message portions of the plaintext block 40169, and furthermore the redundancy included in the plaintext block 40169 is equal to the one shared beforehand, the message portions M'$_1$_40170 and M'$_2$_40171 are extracted from the plaintext blocks 40167 and 40168, respectively, and concatenated to obtain a message M'40172.

Any CPU capable of executing a program can be used for the above embodiments whether it is a general-purpose CPU or a dedicated one. Even though the above embodiments are each implemented by execution of programs by a CPU (or CPUs), dedicated hardware can be used for each process employed, providing high speed and low cost.

Any of known pseudorandom number generators can be applied to the above embodiments. The known pseudorandom number generators include a pseudorandom generator using a linear feedback shift register (LFSR) with a nonlinear filter, a nonlinear feedback shift register, a combining generator, a shrinking generator, a clock-controlled pseudorandom number generator, a Geffe generator, an alternating step generator, RC4, SEAL, PANAMA, the OFB mode of the block cipher, the counter mode of the block cipher, and other pseudorandom number generators using hash functions.

Sixth Embodiment

The above first through fifth embodiments each provides a cryptographic processing method. A sixth embodiment of the present invention, on the other hand, shows that the present invention can be applied to various information systems.

Figure 35:
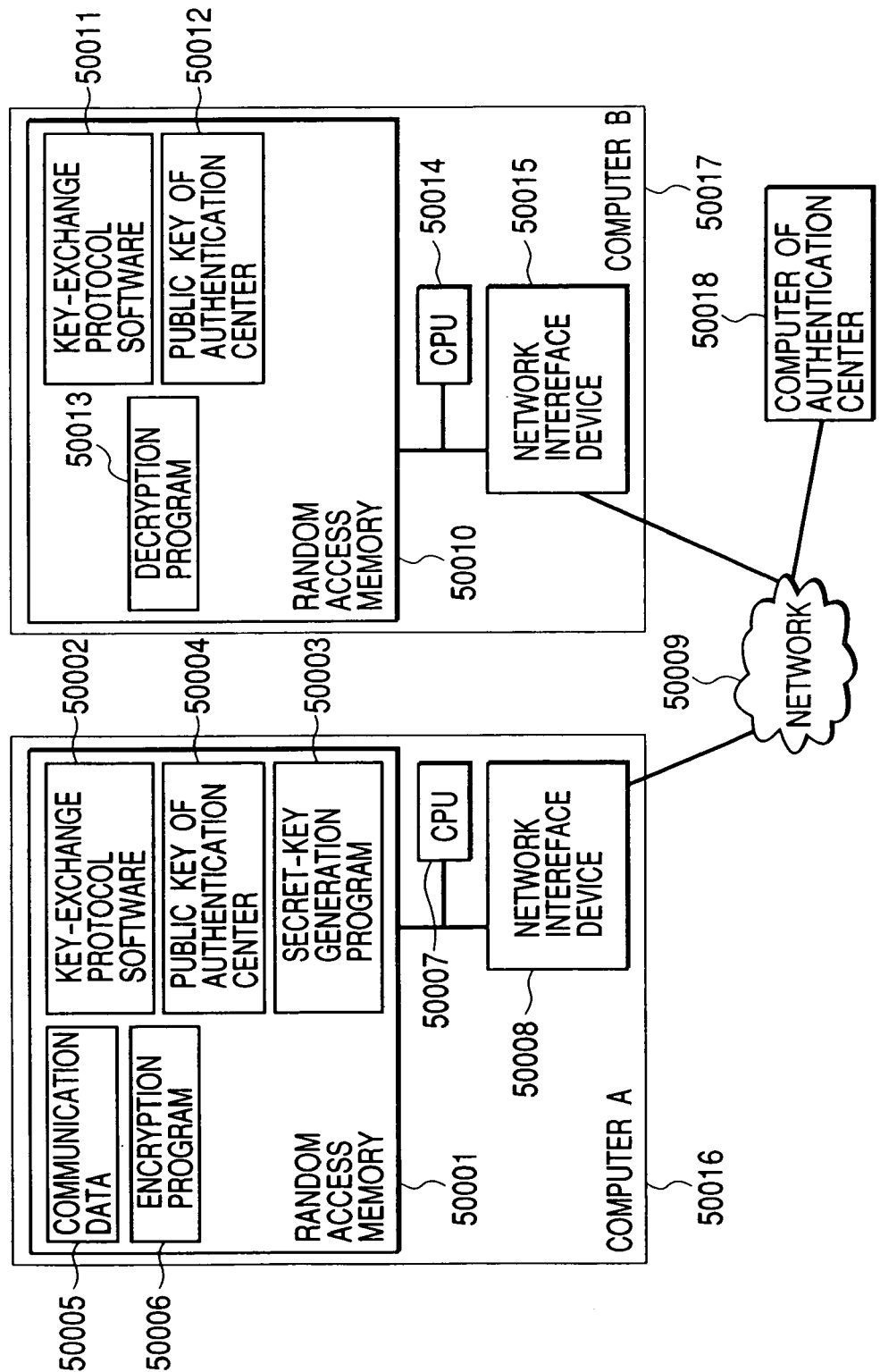
FIG. 35 is a diagram showing the configuration of a system for cryptocommunications according to a sixth embodiment of the present invention.

FIG. 35 is a diagram showing the configuration of a system in which computers A50016 and B50017 are connected through a network 50009 for cryptocommunications from the computer A50016 to the computer B50017. The computer A50016 has a CPU 50007, a RAM 50001, and a network interface device 50008 therein. The RAM 50001 stores key-exchange protocol software 50002 for executing a key-exchange protocol, a public key 50004 of the authentication center, a secret-key generation program 50003, an encryption program 50006, and communication data 50005 (corresponding to the message M in each embodiment described above) to be transmitted using cryptocommunications. The computer B50017 has a CPU 50014, a RAM 50010, and a network interface device 50015 therein. The RAM 50010 stores key-exchange protocol software 50011 and a decryption program 50013.

The computer A executes the secret-key generation program 50003 to generate a secret key used for cryptocommunications with the computer B50017. The computers A50016 and B50017 executes the key-exchange protocol software 50002 and 50011, respectively, to share the secret key generated by the computer A.

After sharing the secret key, the computer A50016 executes the encryption program 50006 of the present invention to encrypt the communication data 50005 at high speed. The computer A50016 then transmits the encryption results to the computer B50017 through the network 50009 using the network interface device 50008.

The computer B50017 executes the decryption program 50013 of the present invention to decrypt received ciphertext at high speed to restore the communication data.

This embodiment shows that the present invention can provide high-speed and safe cryptocommunications even when available hardware resources are limited. That is, the present invention is capable of realizing a highly safe cryptocommunication system which is faster than the conventional cryptographic method, and provides confidentiality as well as a mathematically proven alteration detection function.

Seventh Embodiment

The above sixth embodiment performs cryptographic processing by use of software. A seventh embodiment of the present invention, on the other hand, shows that the present invention can be realized by hardware implementation.

Figure 36:
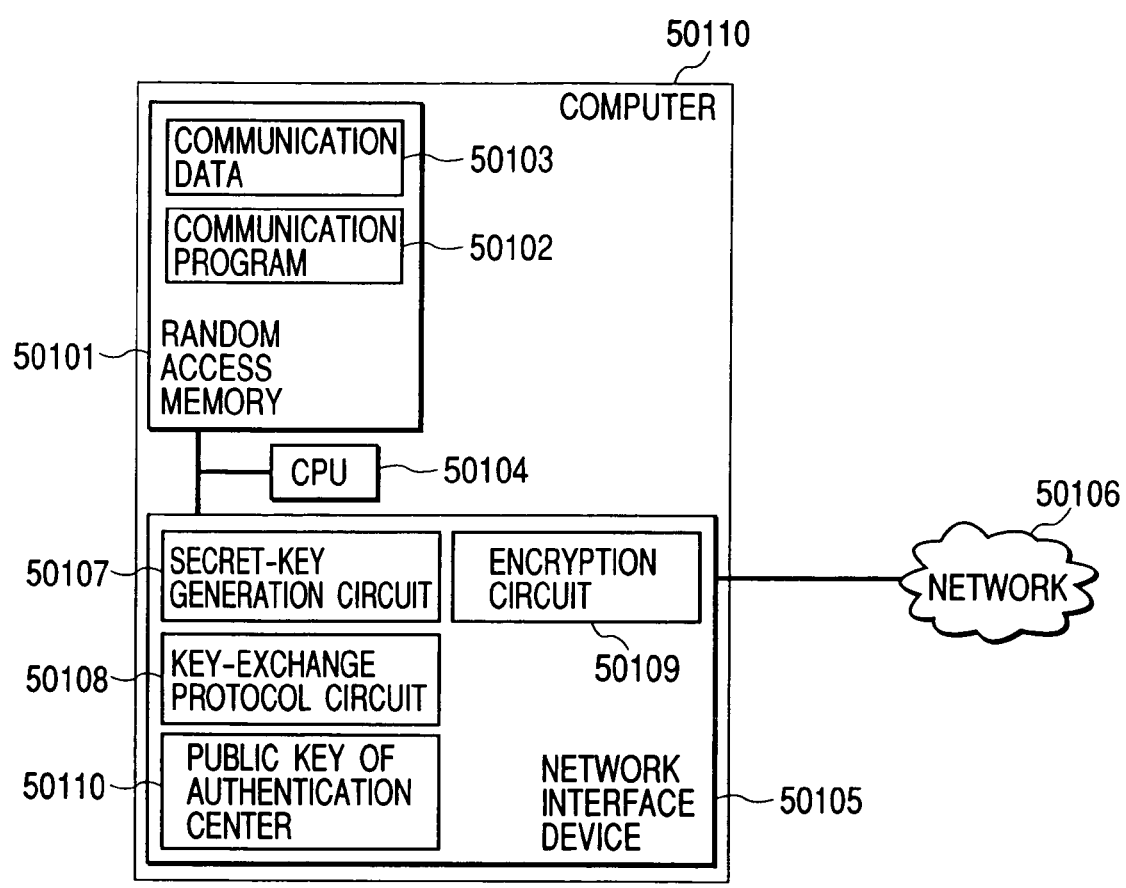
FIG. 36 is a diagram showing the configuration of an encryption apparatus employed in a cryptocommunication system according to a seventh embodiment of the present invention.

FIG. 36 is a diagram showing the configuration of an encryption apparatus employed in a cryptocommunication system using a network. The computer 50110 has a RAM 50101, a CPU 50104, and a network interface device 50105 therein, and is connected to a network 50106. The RAM 50101 stores communication data 50103 (corresponding to the message M in each embodiment described above) to be encrypted and a communication program 50102, and the CPU 50104 executes the communication program 50102 to output the communication data 50103 to the network interface device 50105. The network interface device 50105 includes a secret-key generation circuit 50107, an encryption circuit 50109, and a key-exchange protocol circuit 50108, and has a public key 50110 of the authentication center stored in its memory area. According to the execution of the communication program 50102, the network interface device 50105 generates a secret key by use of the secret-key generation circuit 50107, and exchanges the generated secret key with another device on the network using the key-exchange protocol circuit 50108 so as to share the generated secret key with the communication destination device. The encryption circuit 50109 in the network interface device 50105 encrypts the input communication data 50103 at high speed using the generated and then shared secret key to generate ciphertext, which is then output to the network 50106.

This embodiment shows that the present invention can provide safe and fast cryptocommunications using limited hardware resources. Particularly, if this embodiment is combined with the cryptographic processing method of the second embodiment, more efficient and safe cryptocommunications can be realized. This is because addition and multiplication in the finite field $F2^{64}$ employed in the second embodiment are suitable for hardware implementation. The decryption process can also be implemented by hardware in the same way.

As shown by this embodiment, the present invention can provide a cryptographic method whose hardware implementation requires a small number of gates or performs very high-speed processing.

Eighth Embodiment

By using a computer capable of performing cryptographic processing employed in the sixth or seventh embodiment, it is possible to easily realize a contents delivery protected by encryption. An eighth embodiment of the present invention shows an example of a contents delivery.

Figure 37:
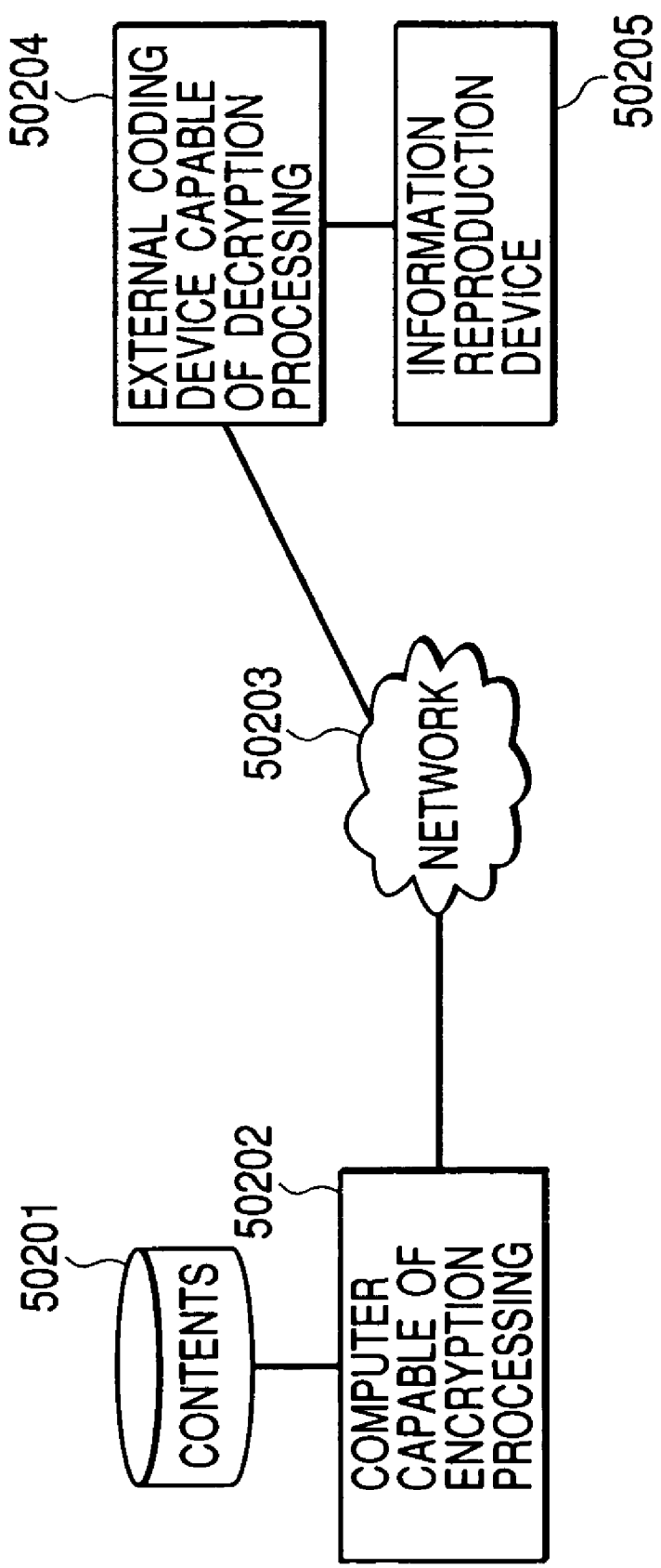
FIG. 37 is a diagram showing the configuration of a contents delivery system according to an eighth embodiment of the present invention.

As shown in FIG. 37, a storage device (whose medium is not limited to a specific type, that is, it is possible to use a semiconductor storage device, a hard disk, a magnetic storage device such as one using tape, or an optical storage device such as a DVD or an MO) storing contents 50201 as digital information is connected to a computer 50202 capable of performing encryption processing according to the present invention. An information reproduction device 50205 (an MPEG reproduction device, a digital TV, a personal computer, etc.) which is to reproduce contents and may be located in a physically remote place is connected to an external coding device 50204 capable of performing decryption processing according to the present invention. The computer 50202 and the external coding device are connected to each other through a network 50203.

The contents 50201 is encrypted by the computer 50202 capable of encryption, and then transmitted to the network 50203. The external coding device 50204 capable of decryption decrypts the encrypted contents, and outputs the decryption results to the information reproduction device 50205. The information reproduction device 50205 stores and reproduces input information.

The contents 50201 handled by the information reproduction device 50205 include not only electronic files but also multimedia data such as computer software, sound, and image. Contents which require real-time processing, such as sound and movie, can be encrypted or decrypted at high speed by applying the present invention, making it possible to secure smooth real-time transmission. Furthermore, the receiving device can detect data corruption due to alteration or noise during the transmission, ensuring communications free of transmission errors.

Ninth Embodiment

The eighth embodiment delivers contents by transmission through a network. When it is necessary to deliver a very large amount of information, however, it is more efficient to deliver ciphertext on a DVD, etc. beforehand, and then transmit the decryption key at the time of permitting the decryption of the ciphertext. Such a system is provided by a ninth embodiment.

Figure 38:
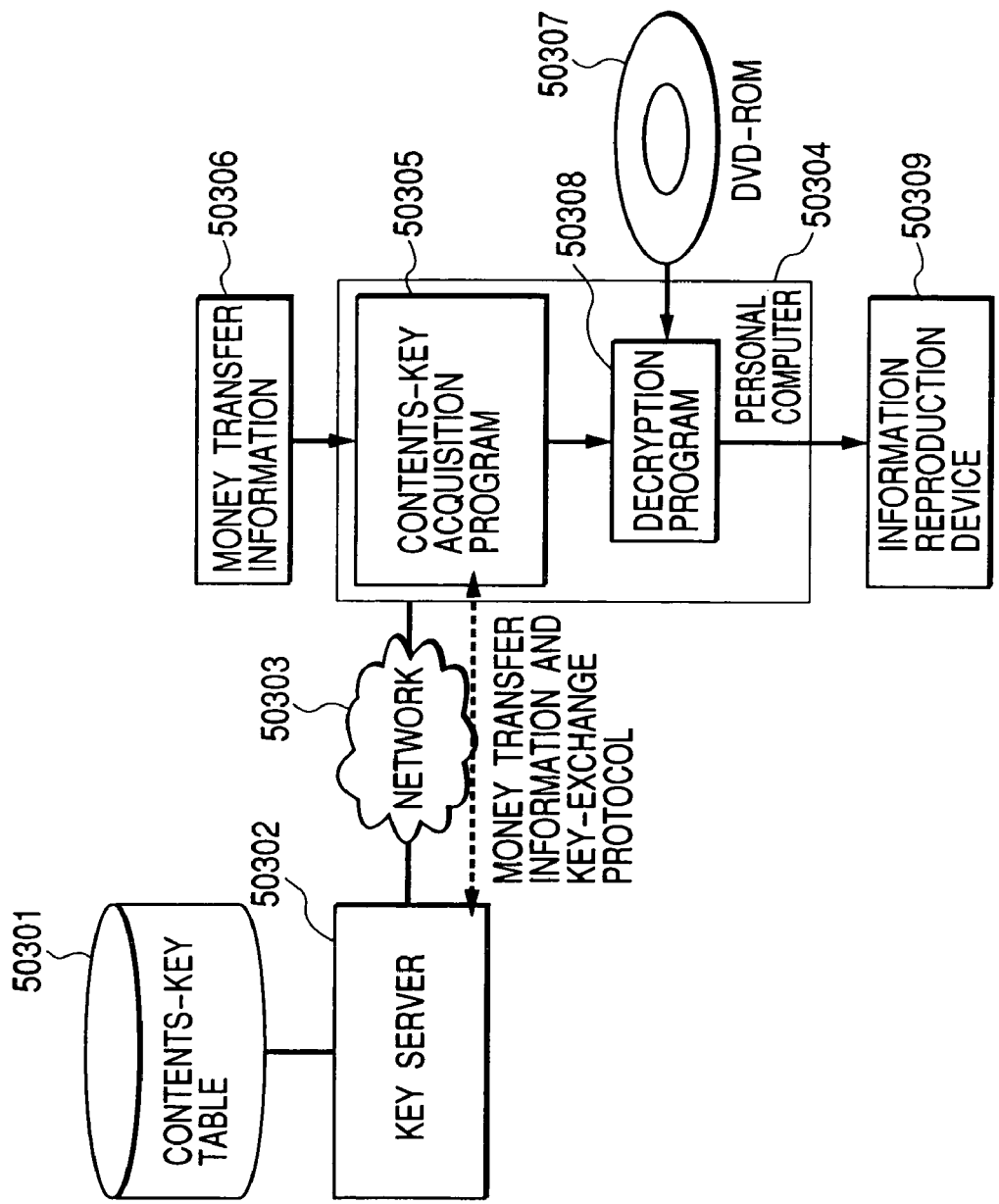
FIG. 38 is a diagram showing the configuration of a system according to a ninth embodiment of the present invention.

As shown in FIG. 38, contents are distributed to the consumer as ciphertext, using a medium such as a DVD-ROM 50307, beforehand. The consumer enters information 50306 (money transfer information) on payment for contents using a contents-key exchange program 50305 running on the consumer's personal computer 50304. The contents-key exchange program 50305 then obtains a key from a contents-key table in a key server 50302 through a network 50303. A decryption program 50308 decrypts the ciphertext contents recorded on the DVD-ROM 50307 using the obtained key. The decryption results are output to the information reproduction device 50309 which then reproduces the contents.

This embodiment may be configured such that the contents are not output to the information reproduction device 50309, and the personal computer 50304 itself reproduces them. In a typical example, the contents is a program to be executed on a personal computer. The above reproduction method of using a personal computer is efficient in such a case. When ciphertext contents recorded on a DVD-ROM can be divided into several parts, and each part is encrypted using a different key, it is possible to control keys transmitted to the contents-key acquisition program 50305 so as to limit contents which can be decrypted by the consumer.

The ninth embodiment was described assuming that data recorded on the DVD-ROM 50307 is to be read out. Generally, a very large amount (a few tens of megabytes to a few hundreds of megabytes) of data is stored on the DVD-ROM 50307, and therefore a fast cryptographic processing method is required for processing such data. Since the present invention can provide high-speed decryption, the present invention is suitably applied to distribution of charged contents using a DVD medium.

Tenth Embodiment

In a tenth embodiment of the present invention, the present invention is applied to a router which controls packet transfer on a network. This router encrypts packets differently depending on the destination router of each packet at the time of their transmission to the network.

FIG. 39 is a diagram showing the configuration of a cryptographic router. The network router 50401 has a routing table 50402, a packet exchanger 50403, network interfaces A50404, B50405, and C50406, and an internal parallel encryption/decryption device 50410 therein. The network interfaces A50404, B50405, and C50406 are connected to external networks A50407, B50408, and C50409, respectively.

The internal parallel encryption/decryption device 50410 has a secret-key table 50411, a router-key storage area 50412, and a parallel encryption/decryption circuit 50413 therein.

A packet sent from the network A50407 is transmitted to the internal parallel encryption/decryption device 50410 through the network interface A50404. After recognizing that the received packet is originated from the network A50407, the internal parallel encryption/decryption device 50410 refers to the secret-key table 50411 to obtain the secret key corresponding to the network A50407, stores the obtained secret key in the router-key storage area 50412, and decrypts the packet using the parallel encryption/decryption circuit 50413. The internal parallel encryption/decryption device 50410 then transmits the decryption results to the packet exchanger 50403.

The following description assumes that this decrypted packet should be transmitted to the network B. The packet exchanger 50403 transfers the packet to the internal parallel encryption/decryption device 50410. The internal parallel encryption/decryption device 50410 refers to the secret-key table 50411 to obtain the secret key corresponding to the network B50408, stores the obtained secret key in the router-key storage area 50412, and encrypts the packet using the parallel encryption/decryption circuit 50413. The internal parallel encryption/decryption device 50410 then transmits the encryption results to the network interface B50405 which, in turn, transmits the received encrypted packet to the network B50408.

This embodiment is applied to an application used in an environment in which a large quantity of hardware resources are available and which requires cryptocommunications at very high speed. In the CBC mode of the block cipher in which parallel processing is difficult to employ, it is difficult to enhance its processing speed even when a large quantity of hardware resources are available. In contrast, parallel processing is very easy to employ in the present invention (providing a high level of parallel operation) since the pseudorandom number generation process is independent from the plaintext and ciphertext processing. That is, the present invention can attain a higher communication speed in the environment in which a large quantity of hardware resources suitable for parallel processing are available.

What is claimed is:

1. A symmetric-key encryption method performed by a computer comprising the steps of:

dividing plaintext composed of a message and redundancy data added to the message to generate a plurality of plaintext blocks each having a predetermined length, wherein the redundancy data is added to detect whether a ciphertext obtained from said plaintext has been altered;

generating a first random number block and a second random number block both corresponding to each of said plurality of plaintext blocks based on a secret key that is an input value;

performing encrypting operations for producing ciphertext blocks each corresponding to each of said plurality of plaintext blocks; and concatenating the series of said ciphertext blocks one after another sequentially to output said series as said ciphertext, wherein one of said encryption operations for producing the ciphertext block i corresponding to the plaintext i ($2 \leq i \leq$ a number of plaintext blocks) comprises:

a first operation step for performing an arithmetic computation on said plaintext block i and said first random number block corresponding to said plaintext block i, a second operation step for performing an arithmetic computation on a result of said first operation step performed on said plaintext block i and said second random number block corresponding to said plaintext block i, and a third operation step for performing an arithmetic computation on a result of said second operation step performed on said plaintext block i and a result of said first operation step performed on said plaintext block i−1, to produce said ciphertext block i, and wherein either said first random number or said second random number is generated in complete isolation from any one of said plurality of plaintext blocks or the result of said second operation step.

2. The symmetric-key encryption method as claimed in claim 1, wherein the step of generating random number blocks divides a random number sequence longer than said series of ciphertext blocks to produce the random number blocks independent of any one of said plaintext blocks.

3. The symmetric-key encryption method as claimed in claim 2, wherein said plaintext includes said message, said redundancy data and secret data of a predetermined length, said secret data being generated based on said secret key.

4. The symmetric-key encryption method as claimed in claim 2, wherein said first operation is an exclusive OR operation, said second operation is a multiplication, and said third operation is an exclusive OR operation.

5. The symmetric-key encryption method as claimed in claim 2, wherein said encryption operation includes multiplication and addition in a finite field.

6. The symmetric-key encryption method as claimed in claim 2, wherein said encryption operation includes a combination of a cyclic shift operation and arithmetic multiplication.

7. The symmetric-key encryption method as claimed in claim 2, wherein said symmetric-key encryption method employs a pseudorandom-number generating means for generating said random number sequence based on said secret key; and wherein said method produces said random number blocks from said random number sequence.

8. A symmetric-key encryption apparatus comprising:

a circuit for dividing plaintext composed of a message and redundancy data added to the message to generate a plurality of plaintext blocks each having a predetermined length;

wherein the redundancy data is added to detect whether a ciphertext obtained from said plaintext has been altered;

a random number generation circuit for generating a first random number block and a second random number block both corresponding to each of said plurality of plaintext blocks based on a secret key that is an input value;

an encryption operation circuit for performing encryption operations to produce ciphertext blocks each corresponding to each of said plurality of plaintext blocks; and a circuit for concatenating the series of said ciphertext blocks one after another sequentially to output said series as said ciphertext, wherein said encryption operation circuit for producing the ciphertext block i corresponding to the plaintext i ($2 \leq i \leq$ a number of plaintext blocks) comprises:

a first circuit for performing a first operation on said plaintext block i and said first random number block corresponding to said plaintext block i, a second circuit for performing a second operation on a result of said first operation performed on said plaintext block i and said first random number block corresponding to said plaintext block i, and a third circuit for performing a third operation on a result of said second operation performed on said plaintext block i and a result of said first operation performed on said plaintext block i−1, to produce a result of said third operation as said ciphertext block i, and wherein either said first random number of said second random number, which is generated by said random number generation circuit, is generated in complete isolation from any one of said plurality of plaintext blocks or the result of said second operation step.

9. The symmetric-key encryption apparatus as claimed in claim 8, wherein said random number generation circuit divides a random number sequence longer than said series of ciphertext blocks to produce the random number blocks independent of any one of said plaintext blocks.

10. The symmetric-key encryption apparatus as claimed in claim 9, wherein said plaintext includes said message, said redundancy data and secret data of a predetermined length, said secret data being generated based on said secret key.

11. The symmetric-key encryption apparatus as claimed in claim 9, wherein said first operation is an exclusive OR operation, said second operation is a multiplication, and said third operation is an exclusive OR operation.

12. The symmetric-key encryption apparatus as claimed in claim 9, wherein said encryption operation circuit performs multiplication and addition in a finite field.

13. The symmetric-key encryption apparatus as claimed in claim 9, wherein said encryption operation circuit includes a cyclic shift operation circuit and an arithmetic multiplication circuit.

14. The symmetric-key encryption apparatus as claimed in claim 9, said random number generation circuit further comprising:

a pseudorandom number generator for generating said random number sequence based on said secret key; and a circuit for producing said random number blocks from said random number sequence.

15. A medium storing a program for causing a computer to perform a symmetric-key encryption method, wherein said program is read into said computer, said program when executed causes said computer to perform the steps of:

dividing plaintext composed of a message and redundancy data added to the message to generate a plurality of plaintext blocks each having a predetermined length, wherein the redundancy data is added to detect whether a ciphertext obtained from said plaintext has been altered;

generating a first random number block and a second random number block corresponding to each of said plurality of plaintext blocks based on a secret key that is an input value;

performing encryption operations for producing ciphertext blocks each corresponding to each of said plurality of plaintext blocks; and concatenating the series of said ciphertext blocks one after another sequentially to output said series as said ciphertext, wherein one of said encryption operations for producing the ciphertext block i corresponding to the plaintext block i ($2 \leq i \leq$ a number of plaintext blocks) comprises:

a first operation step for performing an arithmetic computation on said plaintext block i and said first random number block corresponding to said plaintext block i, a second operation step for performing an arithmetic computation on a result of said first operation step performed on said plaintext block i and said second random number block corresponding to said plaintext block i, and a third operation step for performing an arithmetic computation on a result of said second operation step performed on said plaintext block i and a result of said first operation step performed on said plaintext block i−1 to produce said ciphertext block i, and wherein either said first random number of said second random number is generated in complete isolation from any one of said plurality of plaintext blocks or the result of said second operation step.

16. The medium storing a program as claimed in claim 15, wherein the step of generating random number blocks divides a random number sequence longer than said series of ciphertext blocks to produce the random number blocks independent of any one of said plaintext blocks.

17. The medium storing a program as claimed in claim 16, wherein said plaintext includes said message, said redundancy data and secret data of a predetermined length, said secret data being generated based on said secret key.

18. The medium storing a program as claimed in claim 16, wherein said first operation is an exclusive OR operation, said second operation is a multiplication, and said third operation is an exclusive OR operation.

19. The medium storing a program as claimed in claim 16, wherein said encryption operation includes multiplication and addition in a finite field.

20. The medium storing a program as claimed in claim 16, wherein said encryption operation includes a cyclic shift operation and arithmetic multiplication.

21. The medium storing a program as claimed in claim 16, wherein said symmetric-key encryption method further comprises a step of:

generating pseudorandom numbers to generate said random number sequence based on said secret key; and wherein said method produces said random number blocks from said random number sequence.

22. A program product for causing a computer to perform a symmetric-key encryption method, wherein said program product is read into said computer, said program product comprising:

code for causing said computer to divide plaintext composed of a message and redundancy data added to the message, to generate a plurality of plaintext blocks each having a predetermined length, wherein the redundancy data is added to detect whether a ciphertext obtained from said plaintext has been altered;

code for causing said computer to generate a first random number block and a second random number block both corresponding to each one of said plurality of plaintext blocks based on a secret key that is an input value;

code for causing said computer to perform encryption operations for producing ciphertext blocks each corresponding to each of said plurality of plaintext blocks; and code for causing said computer to concatenate the series of said ciphertext blocks one after another sequentially to output said series as said ciphertext, wherein one of said encryption operations for producing the ciphertext block i ($2 \leq i \leq$ a number of plaintext blocks) comprises:

a first operation step for performing an arithmetic computation on said plaintext block i and said first random number block corresponding to said plaintext block i, a second operation step for performing an arithmetic computation on a result of said first operation step performed on said plaintext block i and said second random number block corresponding to said plaintext block i, and a third operation step for performing an arithmetic computation on a result of said second operation step performed on said plaintext block i and a result of said first operation step performed on said plaintext block i−1, to produce said ciphertext block i, and wherein either said first random number of said second random number is generated in complete isolation from any one of said plurality of plaintext blocks or the result of said second operation step, and wherein said program product is stored in a medium readable by said computer for embodying said codes.

* * * * *

UNITED STATES PATENT AND TRADEMARK OFFICE
CERTIFICATE OF CORRECTION

| | |
|---|---|
| PATENT NO. | : 7,110,545 B2 |
| APPLICATION NO. | : 09/784254 |
| DATED | : September 19, 2006 |
| INVENTOR(S) | : S. Furuya et al. |

It is certified that error appears in the above-identified patent and that said Letters Patent is hereby corrected as shown below:

Title page, should read;
-- (73) Assignee: Hitachi, Ltd., Tokyo (JP) --.

Signed and Sealed this

Tenth Day of April, 2007

JON W. DUDAS
*Director of the United States Patent and Trademark Office*